United States Patent
Vadodaria

(10) Patent No.: US 9,531,862 B1
(45) Date of Patent: Dec. 27, 2016

(54) CONTEXTUAL LINKING MODULE WITH INTERACTIVE INTELLIGENT AGENT FOR MANAGING COMMUNICATIONS WITH CONTACTS AND NAVIGATION FEATURES

(71) Applicant: Vishal Vadodaria, Fairfax, VA (US)

(72) Inventor: Vishal Vadodaria, Fairfax, VA (US)

(73) Assignee: Vishal Vadodaria, Fairfax, VA (US)

( * ) Notice: Subject to any disclaimer, the term of this patent is extended or adjusted under 35 U.S.C. 154(b) by 0 days.

(21) Appl. No.: 14/846,272

(22) Filed: Sep. 4, 2015

(51) Int. Cl.
| | |
|---|---|
| G06F 3/033 | (2013.01) |
| H04M 1/725 | (2006.01) |
| H04L 12/58 | (2006.01) |
| H04W 4/12 | (2009.01) |
| H04W 4/18 | (2009.01) |
| G06F 3/0488 | (2013.01) |
| G06F 17/24 | (2006.01) |
| G06F 3/0481 | (2013.01) |
| G06F 3/01 | (2006.01) |
| G06F 9/44 | (2006.01) |

(52) U.S. Cl.
CPC ........ *H04M 1/72552* (2013.01); *G06F 3/0488* (2013.01); *G06F 17/24* (2013.01); *H04L 51/063* (2013.01); *H04L 51/26* (2013.01); *H04L 51/32* (2013.01); *H04M 1/72583* (2013.01); *H04W 4/12* (2013.01); *H04W 4/18* (2013.01); *G06F 3/017* (2013.01); *G06F 3/0481* (2013.01); *G06F 3/04883* (2013.01); *G06F 9/4446* (2013.01)

(58) Field of Classification Search
USPC ........................................ 715/863, 709, 706
See application file for complete search history.

(56) References Cited

U.S. PATENT DOCUMENTS

| | | | | |
|---|---|---|---|---|
| 2004/0260543 | A1* | 12/2004 | Horowitz | G10L 15/193 704/221 |
| 2011/0087744 | A1* | 4/2011 | Deluca | G06Q 10/107 709/206 |
| 2011/0304632 | A1* | 12/2011 | Evertt | G06F 3/011 345/474 |
| 2013/0060869 | A1* | 3/2013 | Davis | G06Q 50/01 709/206 |

(Continued)

OTHER PUBLICATIONS

Thom Adams, The Internet and the "Ah-Ha" Experience, Sep. 1998, Agency Sales Magazine, pp. 23-25.*

(Continued)

*Primary Examiner* — Linh K Pham
*Assistant Examiner* — Tam Tran
(74) *Attorney, Agent, or Firm* — Juneau & Mitchell; Todd L. Juneau

(57) ABSTRACT

A system to optimize a user's messaging by having a mechanism to recommend that a user utilizes an alternative communication channel. The invention relates to mobile messaging applications and to analyzing message content and providing feedback to the user in the form of a graphical or spoken output containing an offer of an alternative communication mode, wherein processing content of the user input comprises analyzing message content to collect parameters relating to message priority, channel type, channel availability, user schedule, user time zone, relationship of user to recipient calculated using a familiarity index, type of content, and number of recipients.

12 Claims, 29 Drawing Sheets

(56) References Cited

U.S. PATENT DOCUMENTS

| | | | |
|---|---|---|---|
| 2014/0156674 A1* | 6/2014 | Alberth, Jr. | G06F 17/30312 707/748 |
| 2015/0066479 A1* | 3/2015 | Pasupalak | G06F 17/27 704/9 |
| 2015/0301729 A1* | 10/2015 | Wang | G06F 3/0485 715/707 |

OTHER PUBLICATIONS

VerticalNews journalists, "System and Method for Software Turret Phone Capabilities", Sep. 18, 2014, NewsRx, pp. 1-4.*

* cited by examiner

PERSONAL

Contact's Home Address

CONTEXTUAL LINKING MODULE WITH INTERACTIVE INTELLIGENT AGENT FOR MANAGING COMMUNICATIONS WITH CONTACTS AND NAVIGATION FEATURES

CROSS REFERENCE TO RELATED APPLICATIONS

There are no related applications which are hereby cross-referenced.

STATEMENT REGARDING FEDERALLY SPONSORED RESEARCH

No federal government funds were used in researching or developing this invention.

NAMES OF PARTIES TO JOINT RESEARCH AGREEMENT

There are no additional parties related to this application subject to a joint research agreement.

REFERENCE TO A SEQUENCE LISTING

A table or a computer list appendix on a compact disc is not included herein.

FIELD OF THE INVENTION

The invention relates to systems and methods for optimizing a user's electronic mobile device messaging by having a mechanism to provide recommendations for the user to consider utilizing an alternative communication channel.

BACKGROUND OF THE INVENTION

Software applications for mobile devices have provided users with the option of sending messages. However, messaging applications do not provide an option for setting a priority, for comparing schedules, for changing the tone or manner based upon the relationship with the recipient, for automatically correcting text, for automatically generating and validating navigation information for events. Accordingly, there is a need for systems and methods that can actively manage the experience that a user has with an electronic message.

BRIEF SUMMARY OF THE INVENTION

Accordingly, there is provided a context linked message invention that relates to mobile messaging applications and to analyzing message content and providing feedback to the user in the form of a graphical or spoken output containing an offer of an alternative communication mode, wherein processing content of the user input comprises analyzing message content to collect parameters relating to message priority, channel type, channel availability, user schedule, user time zone, relationship of user to recipient calculated using a familiarity index, type of content, and number of recipients.

The invention also relates to systems, mobile device applications, computer-readable storage media, and methods, for linking user inputs such as typed text or voice commands in a mobile device to specific actions by providing a context linked message application which includes specific processing features as disclosed herein.

In one preferred embodiment, there is provided a system for accepting ambiguous user input relating to a name of a person and resolving the ambiguous user input using language processing features.

In another preferred embodiment, there is provided a system to optimize a user's communication channel by having a mechanism to recommend that a user utilizes an alternative communication channel by analyzing message content to collect parameters relating to priority, channel availability, user schedules, user time zones, relationship, type of content, and number of recipients.

In a further embodiment, the relationship is calculated using a familiarity scale or index which provides a numerical value based on relationship hierarchy and can automate re-transcription of content based on said hierarchy. In another embodiment, the priority, channel, schedule, time zones are co-factored with relationship parameters.

In another embodiment, the recipient's schedule is retrieved as another parameter for optimizing the communication channel. In a further embodiment, the recipient's schedule parameter is compared to the user's schedule parameter and a scheduling database is populated with an entry that uses the comparison data. In yet a further embodiment, specific customized personality profile parameters can be set by users within such a system. In another embodiment, the specific customized personality profile parameters can be set to establish priority overrides where a user schedule has a higher priority than a recipient schedule, or vice versa.

In another embodiment of the present invention, the name resolution module retrieves additional information from the content, such as area code, city and state of address, IP address, type of device, device vendor, device electronic identity number, network or domain membership, type of domain, encryption status, carrier identity, and type of network such as 3G, 4G, and LTE.

In another embodiment, a semantic message conversion module identifies command-form user inputs and converts them to standard polite-format messages.

In another embodiment of the present invention, a communication channel resolver outputs to a user a series of selectable options for modifying the initial message, where the options are provisioned using the parameters discussed herein.

In yet another preferred embodiment of the present invention, a navigation resolution module scans messages for destination location, source location, transportation modes, and routing information, the navigation resolution module can then compare the scanned message results against location information retrieved from a contacts database, from a user's GPS output, from a user's WiFi location identifier, a recipient's GPS output, a recipient's WiFi location identifier to generate an initial navigation set, the navigation set is then processed using an address validation module to connect to an external address validation service, once the address is validated, the mapping functionality of the user's device generates a navigation solution and display map, which is saved to memory, and is linked to the message sent by the user.

In another embodiment, the system includes an attribute clarification module which identifies unclear meanings within a message content, where the unclear meaning can comprise plural items that do not have numerical attributes, calendar items that are missing date and time attributes, relationship items that are missing hierarchy attributes, navigation items that are missing location attributes, and so forth, and where the attribute clarification module automatically formulates a question or option for a user to add the missing attributes.

In another preferred embodiment, there is provided a method of providing a contextual linking application having an animated interactive intelligent agent for managing communications with contacts in a portable mobile electronic device, comprising the steps:

in a mobile electronic device having one or more processors, and memory storing one or more programs configured to be executed by the one or more processors, executing one or more programs including instructions for providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and in response to user input in a messaging application, processing content of the user input, and providing feedback to the user:

wherein the feedback comprises a graphical or spoken output from the portable electronic device, said output comprising an offer of an alternative communication mode, wherein processing content of the user input comprises analyzing message content to collect parameters relating to message priority, channel type, channel availability, user schedule, user time zone, relationship of user to recipient, type of content, and number of recipients, and saving said collected parameters to memory; and wherein the relationship parameter is calculated using a familiarity index, the familiarity index comprising a numerical value based on relationship hierarchy.

further comprising wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

In another preferred embodiment, there is provided a method as herein further comprising the step wherein the one or more programs include instructions for providing feedback to the user wherein the feedback comprises a graphical or spoken output from the portable electronic device, said output comprising a series of selectable options for modifying the initial user input.

In another preferred embodiment, there is provided a method as herein further comprising the step wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service In another preferred embodiment, there is provided a method as herein further comprising the step wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided a method as herein further comprising the step wherein the one or more programs include instructions for providing feedback to the user wherein the feedback comprises a graphical or spoken output from the portable electronic device, said output comprising an automated re-transcription of content with said user input based on said relationship hierarchy.

In another preferred embodiment, there is provided a method as herein further comprising the step wherein the one or more programs include instructions for providing feedback to the user wherein the feedback comprises a graphical or spoken output from the portable electronic device, said output comprising wherein a recipient schedule is retrieved as a parameter, wherein the recipient schedule parameter is compared to the user schedule parameter and a scheduling database is populated with an entry that uses the comparison data.

In another preferred embodiment, there is provided a method as herein further comprising the step wherein specific customized personality profile parameters can be set to establish priority overrides where a user schedule has a different priority than a recipient schedule.

DETAILED DESCRIPTION OF THE INVENTION

Definitions

Mobile Devices

Figure 1:
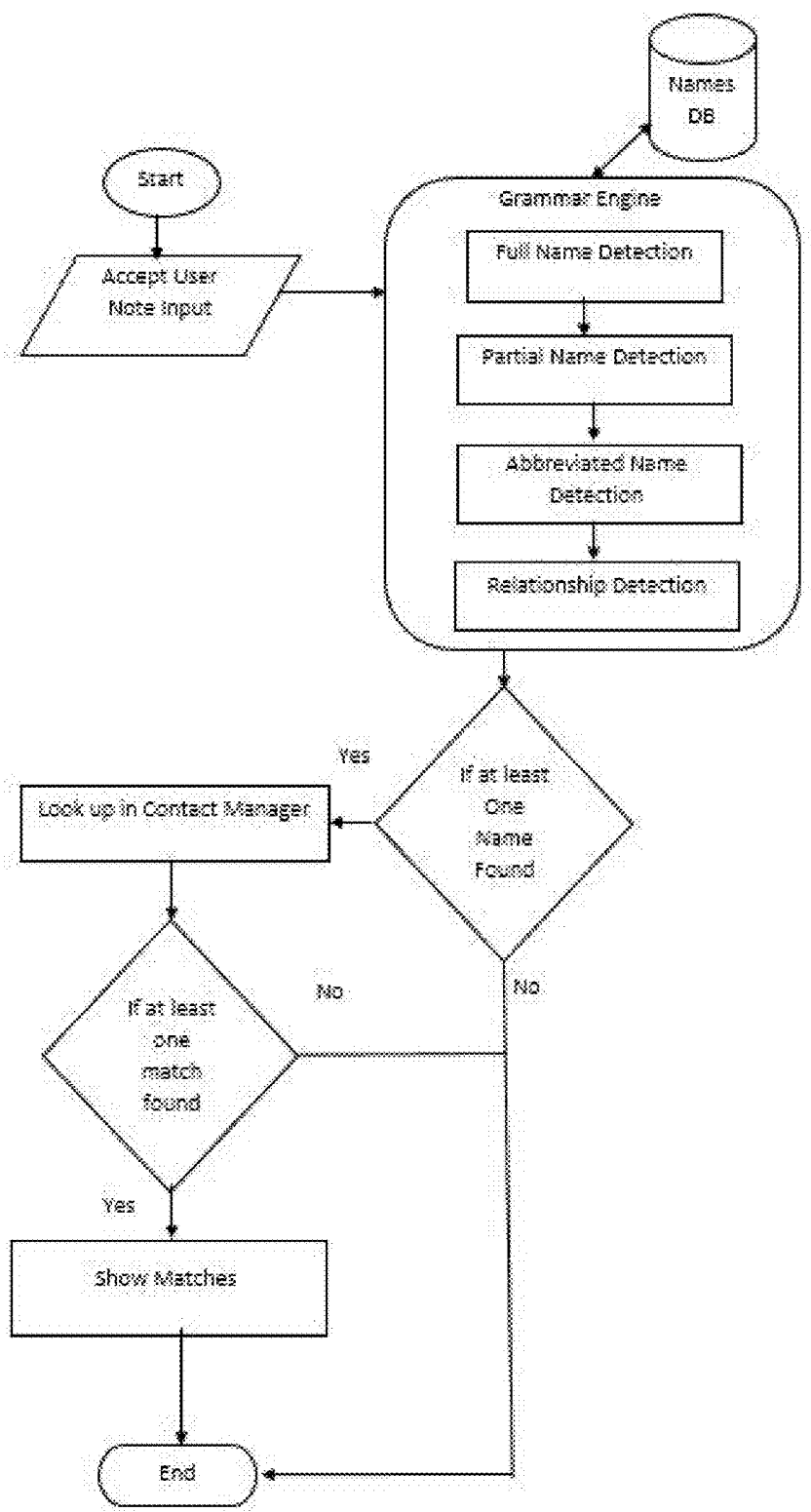
FIG. 1 is a functional block diagram of an architectural overview of one embodiment of the contact name/person resolution module showing computational flow.

Embodiments of the present invention make use of a mobile communication device. As contemplated herein a mobile device is a two-way communication device with advanced data communication capabilities having the capability to communicate in a wireless or wired fashion with other computing devices. As adequately described in U.S. Pat. No. 7,912,480, mobile devices include the capability for voice communications and data messaging, as well as capabilities as wireless Internet appliances. Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Communications Networks

Data and voice communications are performed through a communication subsystem that receives messages from and sends messages to a wireless network. The communication subsystem can be configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), Intelligent Digital Enhanced Network (iDEN™), 4G, LTE, LTE Advanced, and 5G standards.

Mobile Device Hardware and Subsystems

The main processor interacts with subsystems such as Random Access Memory (RAM), flash memory, display, auxiliary input/output (I/O) subsystem, data port, keyboard, speaker, microphone, short-range communications.

Some of the subsystems perform communication-related functions, whereas other subsystems provide "resident" or on-device functions. By way of example, the display and the keyboard can be used for both communication-related functions, such as entering a text message for transmission over the network, and device-resident functions such as a calculator or task list.

Operating system software used by the main processor is typically stored in a persistent store such as the flash memory, which can alternatively be a read-only memory (ROM) or similar storage element. Those skilled in the art will appreciate that the operating system, specific device applications, or parts thereof, can be temporarily loaded into a volatile store such as the RAM.

Mobile devices send and receive communication signals over wireless networks after network registration or activation procedures are completed.

The main processor, in addition to its operating system functions, enables execution of software applications on the mobile device. The subset of software applications that control basic device operations, including data and voice communication applications, will normally be installed on the mobile device during its manufacture. The programs can include an email program, a web browser, an attachment viewer, and the like.

Mobile devices also include a device state module, an address book, a Personal Information Manager (PIM), and other modules. The device state module can provide persistence, i.e. the device state module ensures that important device data is stored in persistent memory, such as the flash memory, so that the data is not lost when the mobile device is turned off or loses power. The address book can provide information for a list of contacts for the user. For a given contact in the address book, the information can include the name, phone number, work address and email address of the contact, among other information. The PIM has functionality for organizing and managing data items of interest to a subscriber, such as, but not limited to, e-mail, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device with respect to such items. This can be particularly advantageous when the host computer system is the mobile device subscriber's office computer system.

Additional applications can also be loaded onto the mobile device through at least one of the wireless network, the auxiliary I/O subsystem, the data port, or the short-range communications subsystem. This flexibility in application installation increases the functionality of the mobile device and can provide enhanced on-device functions, communication-related functions, or both. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices.

Generally, a received signal such as a text message, an e-mail message, or web page download will be processed by the communication subsystem and input to the main processor. The main processor will then process the received signal for output to the display or alternatively to the auxiliary I/O subsystem. A subscriber can also compose data items, such as e-mail messages, for example, using the keyboard in conjunction with the display and possibly the auxiliary I/O subsystem. The auxiliary subsystem can include devices such as: a touch screen, mouse, track ball, infrared fingerprint detector, or a roller wheel with dynamic button pressing capability. A composed message can be transmitted over the wireless network through the communication subsystem.

For voice communications, the overall operation of the mobile device is substantially similar, except that the received signals are output to the speaker, and signals for transmission are generated by the microphone. Alternative voice or audio I/O subsystems, such as a voice message recording subsystem, can also be implemented on the mobile device. Although voice or audio signal output is accomplished primarily through the speaker, the display can also be used to provide additional information such as the identity of a calling party, duration of a voice call, or other voice call related information.

Communication subsystems comprise a receiver and a transmitter, one or more embedded or internal antennas, Local Oscillators, and a communications processor for wireless communication. The communications processor can be a Digital Signal Processor (DSP).

Non-transitory computer-readable storage media includes any physical form capable of storing and providing access to computer instructions that, when executed by a computer processor, cause the processor to perform the functions described in the steps provided herein. Media may include without limitation a hard drive, solid state drive, flash memory, and ROM memory.

Processor comprises electronic processing circuitry or control circuitry that operates to control the operations and performance of the electronic device and the application thereon.

Input interfaces comprise inputs to electronic circuitry comprising one or more tactile inputs, microphone inputs, camera input. Outputs comprise one or more display outputs, speaker outputs, and tactile/haptic outputs. Inputs and outputs may connect by wire or wirelessly and include appropriate hardware, firmware and software for successful connection. An example of mobile electronic devices contemplated for use in the present invention include without limitation by way of example an Apple iPhone 3-4-5-6, Apple iPads, Apple Minis, Samsung Galaxy series smartphones and tablets, as well as similar Windows operated devices, and other Android operated devices.

Signals and Networks

Signals received by the antenna through the wireless network are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor. In a similar manner, signals to be transmitted are processed, including modulation and encoding, by the communications processor. These processed signals are input to the transmitter for digital-to-analog (D/A) conversion, frequency up conversion, filtering, amplification and transmission over the wireless network via the antenna.

The wireless link between the mobile device and the wireless network can contain one or more different channels, typically different RF channels, and associated protocols used between the mobile device and the wireless network.

An RF channel is a limited resource that must be conserved, typically due to limits in overall bandwidth and limited battery power of the mobile device.

Messages intended for a user of mobile device are initially received by a message server of LAN. Such messages may originate from any of a number of sources, including from a computer within LAN, from a different mobile device connected to wireless network, directly from a different computing device.

Message servers typically act as the primary interface for the exchange of messages, particularly e-mail messages, within an organization and over the shared network infrastructure. Each user in the organization that has been set up to send and receive messages is typically associated with a user account managed by a message server.

Message servers may: monitor the user's "mailbox" for new e-mail messages; apply user-definable filters to new messages to determine if and how the messages will be relayed to the user's mobile device; push messages to a mobile device, receive messages composed on mobile device, re-format the composed messages, and re-route the composed messages for delivery.

Mobile Server

The wireless support components may also include a mobile note server that, in a similar manner to that of the message management server, facilitates the handling of electronic messages. For example, mobile note server may: provide a storage area for a user's electronic messages; monitor for new or edited messages; communicate with other devices when a messages is edited; communicate with other servers; and the like.

Embodiments include a system for electronic messages in a mobile environment. This system includes a mobile messages controller, which controls the operation of the system and co-ordinates the various functional blocks within the system. The mobile messages controller is connected to, and interacts with, a messages database, an input module, an output module, a display/notification module, a location module, and a time module.

The system allows a user to enter electronic messages into the messages database via the input module and the mobile messages controller. When entering a new electronic message or editing an electronic message, the user (the person inputting the electronic message) is given the option of entering information, for example, in various fields, including, for example, a location and a time. This information allows the person inputting the electronic message to better define when the electronic message should be made active and/or when a user is to be notified.

NLP: Natural Language Processing

Natural language processing (NLP) refers to the computer understanding, analysis, manipulation, and/or generation of natural language. NLP is a subfield of artificial intelligence and linguistics. It studies the problems of automated generation and understanding of natural human languages. Natural language generation systems convert information from computer databases into normal-sounding human language, and natural language understanding systems convert samples of human language into more formal representations that are easier for computer programs to manipulate.

Processing natural language for numerous applications is generally well known. Recent interest in processing has been due in large part by computer applications such as language translation, grammatical correction of sentences as part of word processing systems, and the like. For example, Machine Translation Technology: On the Way to Market Introduction, Siemens Review, Vol. 54, No. 6 November/December (1987) describe research into machine translation of text in several languages. Also, the use of language parsing in processing natural language is well known. Many parsing techniques have been described, see for example, J. J. Robinson, Diagrams: A Grammar for Dialogues, Communication of the Association for Computing Machinery, Vol. 25, No. 1, January 1982, pp. 27-47, which discloses an interactive filter procedure, a grammar core, a weakening factor, a probability factor and a threshold mechanism; and K. Vehara, et al., Steps Toward an Actor-Oriented Integrated Parser, Proceeding of the International Conference of Fifth Generation of Computer Systems 1984, Tokyo, Japan, Nov. 6-9, 1984 (ICOT, North Holland).

Methods of grammatically processing a sentence using parsers are described in: Allen, James; Natural Language Understanding. (The Benjamin/Cummings Publishing Company Inc., Menlo Park, U.S.A. 1987.)

The parsers there described operate according to an algorithm based on a rewriting mechanism. This mechanism requires that the parsers carry out parsing by reference to a large number of rewriting rules. These rewriting rules make a connection between a group of words and/or sentence constituents, on the one hand, and a parent constituent, i.e. a constituent dominating this group, on the other hand.

The number of rewriting rules depends on the extent of the description mechanism to be used and forming the basis of the parser.

As defined herein, feedback that comprises a graphical or spoken output from the portable electronic device is performed by an intelligent agent displayed by means of an Animated 3D Personal Virtual Assistant with Facial Expressions, hand gestures and body movements in a Human like appearance. This is not an abstract intelligent agent functionality but it is personified by means of an intelligent agent displayed by means of an Animated 3D Personal Virtual Assistant with Facial Expressions, hand gestures and body movements in a Human like appearance and includes these features:

1. programmed to process/understand language using NLP/NLU (Natural language processing/understanding) Features 2. programmed to represent knowledge in a Cognitive Model using Semantic Actions and Entities/Concepts and their inter-relationships and 3. programmed to express its knowledge by generating English responses using NLG (Natural Language Generation) features 4. programmed to maintain behavioral states and feelings in a computational manner as a result of circumstantial triggers, user's behavior and Agent's own productivity by means of a Psychology Engine and express the same using facial Expressions rendered in a 3D Avatar 5. programmed to have Conversations/Dialogs in a taking-turns, i.e. dialogue, manner while remembering the context of the conversation in a Contextual Memory, as compared to just answering a question asked by the user and then forgetting it.

Referring now to the Figures, FIG. 1 is a functional block diagram of an architectural overview of one embodiment of the contact name/person resolution module showing computational flow. FIG. 1 shows an overview of how the context linked message system (CLM) has a feature to automatically recognize the text typed in the notes and then link this text to one of the following objects/actions:

Actions:

Actions can be grouped under two major categories:

Communicate Actions

A Call Action: Keywords like "Call" in relation to a Contact object (mentioned earlier) will get recognized as a Call action. If the number to dial is specifically mentioned like in example 2, the number is automatically linked to the call action. However in case there are multiple numbers available for a particular Contact object, the application will prompt the user to choose the desired number of the contact on the user's phone.

A Text Action: Keywords like "Message" or "Text" in relation to a Contact object will get recognized as sending a Text Message action.

A Email Action: Keywords like "Email" or "Send" get recognized as an email action. The application also recognizes keywords like "document" or "photos" to try and guess the email address of the Contact object. For example, sending documents would usually be done through a company email address, while sending photos would usually be done through a personal email address.

A Notify Action: Keywords like "Check with" or "ask" or "invite" in relation to a Contact object will get recognized as a notification action. The Channel Resolver module then chooses the best channel of communication i.e. A Text Message or An Email or A Call to notify the contact. This is shown in example 5.

Navigate Action

Keywords like "Go to" or "Drive to" or "Visit" or "Hang out at" will get recognized as navigate action and will work together with the Place object and one or many route objects (mentioned earlier). This can be seen in example 4.

Entities:

Entities are usually nouns like a name of a person or place. Actions work upon entities.

A Person: An explicitly stated name of a person (first name or last name or both) will get recognized as a person entity. If an exact match is found, the application will directly link to it. However, if there is an ambiguous name the application will prompt the user to choose the desired contact from the user's phone. This is demonstrated in example 1. Also if a person is implicitly state for example "My Boss" or "My Wife" will get recognized as a person entity.

A Contact: A contact is a specialization of a person entity. A contact has a definite relationship with the user for example, a friend, colleague or family member. A person on the other hand might not have a relationship with the user, for example an actor in a movie.

A Location: A noun resembling a place on a map or a place in relation to a person. For example:

"John F. Kennedy International" will automatically get recognized as an airport.

"Bob's home" will get recognized as the home address of Bob who is a contact on the user's phone. This can be seen in example 4.

A Route: Keywords like "through the highway" or "via 21st Street" will get recognized as part of a route to a place. This works together with the place object (mentioned earlier). This can be seen in example 4.

A Message: The Semantic Message Converter module recognizes keywords which can act as templates to generate a text message to the Contact. Instructions like "Message Bob there's a the delay in shipment" automatically generate a text message with the context like "Hi Bob, There is a delay in the shipment." This is shown in example 3. A message can be sent to multiple channels like email, SMS or a phone call.

A File/Folder: Keywords like "document" or "photos" or "pictures" get recognized as files or folders on Google Drive. The application recognizes the file or folder name to search for based on the context. For example, with "My 28th birthday party photos" the application recognizes the file/folder name "28th birthday party photos" and performs a search on Google Drive to find possible matches. If an explicit match is found, the application directly links to it. However if there are multiple matches found the application will prompt the user to select the desired file/folder to be linked.

Special Feature #1. Ambiguous Person Name(s) Resolution:

The Person Resolver Module contains a method to co-relate partial person names (including underspecified names such as only first name(s) or only last name(s)) of one or more people in a user input Task/Todo to a corresponding Contact in the Contact Manager of the Mobile device.

FIG. 1 shows in a Flow Chart how a Person Name is resolved.

Example 1

In the example below the user manually resolves "Jason" to the contact "Jason Smith".

The user notices the exclamation next to the Call Icon and taps on it which highlights the word "Jason" and displays the list of contacts having "Jason" as their first name.

Figure 2:
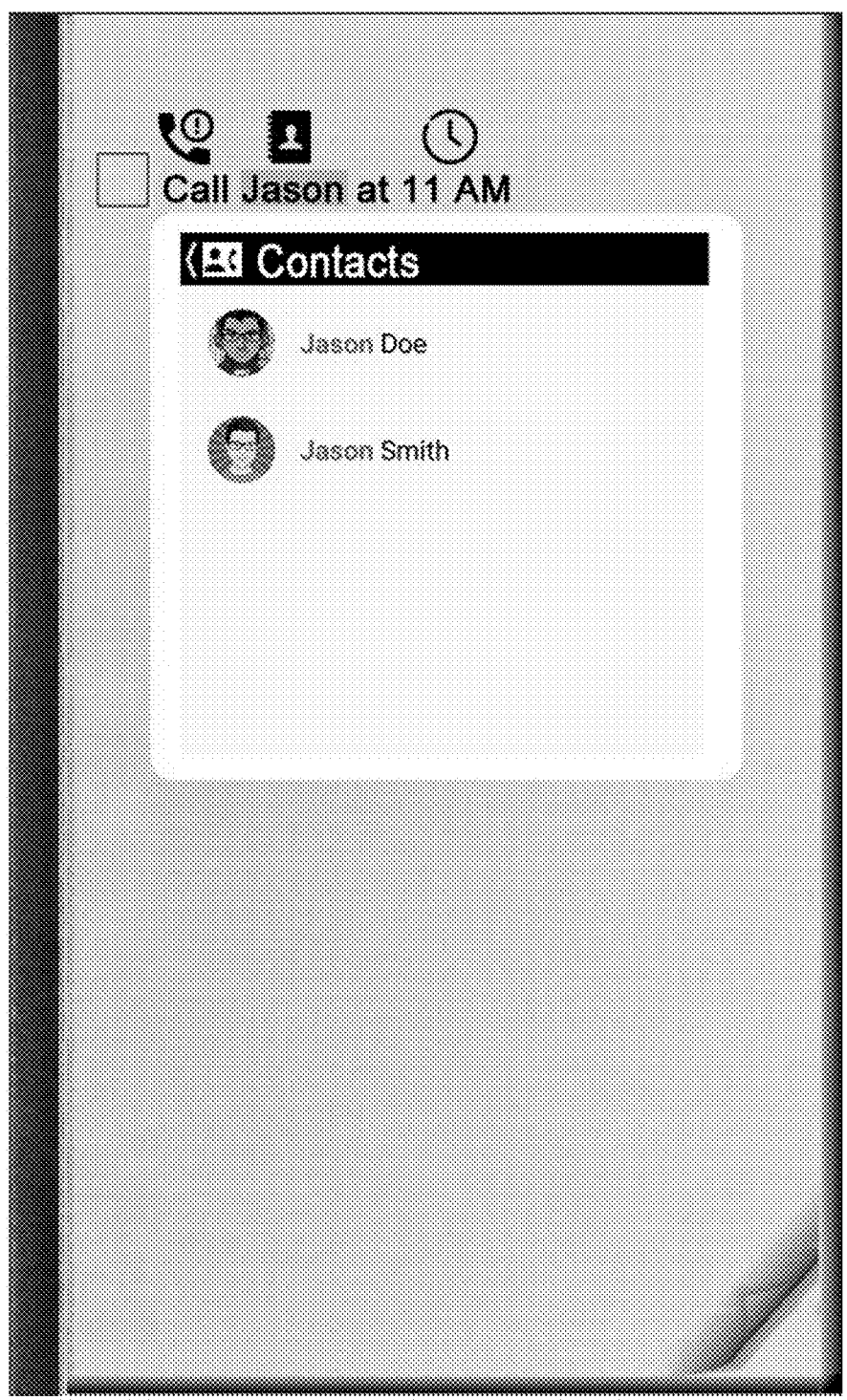
FIG. 2 is an illustrative representation of mobile device screen shot showing a contact list responsive to a user's input command.

Referring now to FIG. 2, FIG. 2 shows an illustrative representation of mobile device screen shot showing a contact list responsive to a user's input command.

Once the user chooses the desired contact, in this case Jason Smith, the user is shown the contact's details which includes the list of numbers suggested by the Channel Resolver.

Once the user chooses the desired number the popup is closed and the exclamation mark is removed.

Figure 3:
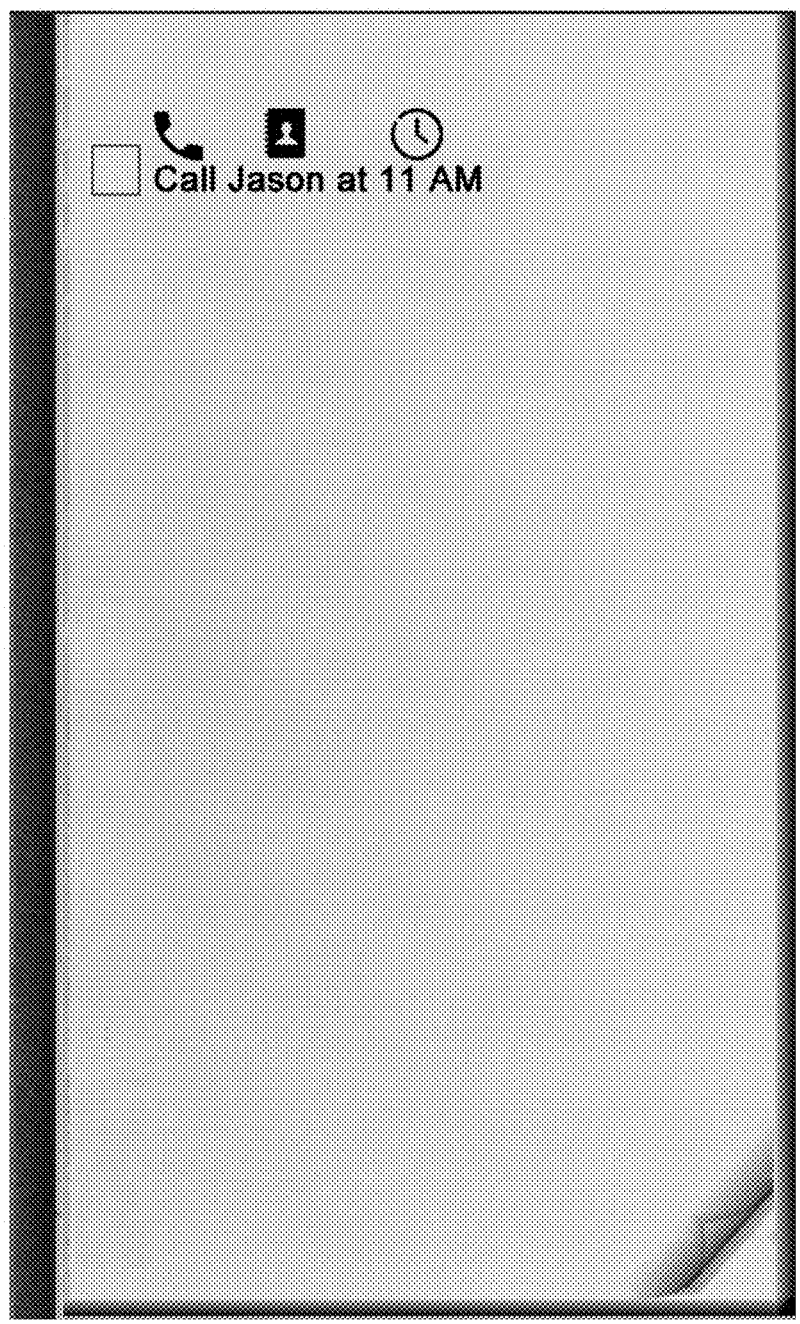
FIG. 3 is an illustrative representation of a mobile device screen shot showing how the event is resolved to the selected person and the event is saved to memory.

Referring now to FIG. 3, FIG. 3 shows an illustrative representation of a mobile device screen shot showing how the event is resolved to the selected person and the event is saved to memory.

Example 2

In the previous example "Jason" was only a single person but if we have a sentence like "Invite Becky Ted John Tim for the party next week".

The Person Resolver detects these as the abbreviated first names "Becky, Ted, John and Tim" converts them to their full names "Rebecca, Theodore, Johnathon and Timothy".

It then looks at the user's phone contacts and finds matches for either the abbreviated names or their full names.

The Person Resolver then shows a list of possible matches and allows the user to deselect any falsely recognized contacts.

Figure 4:
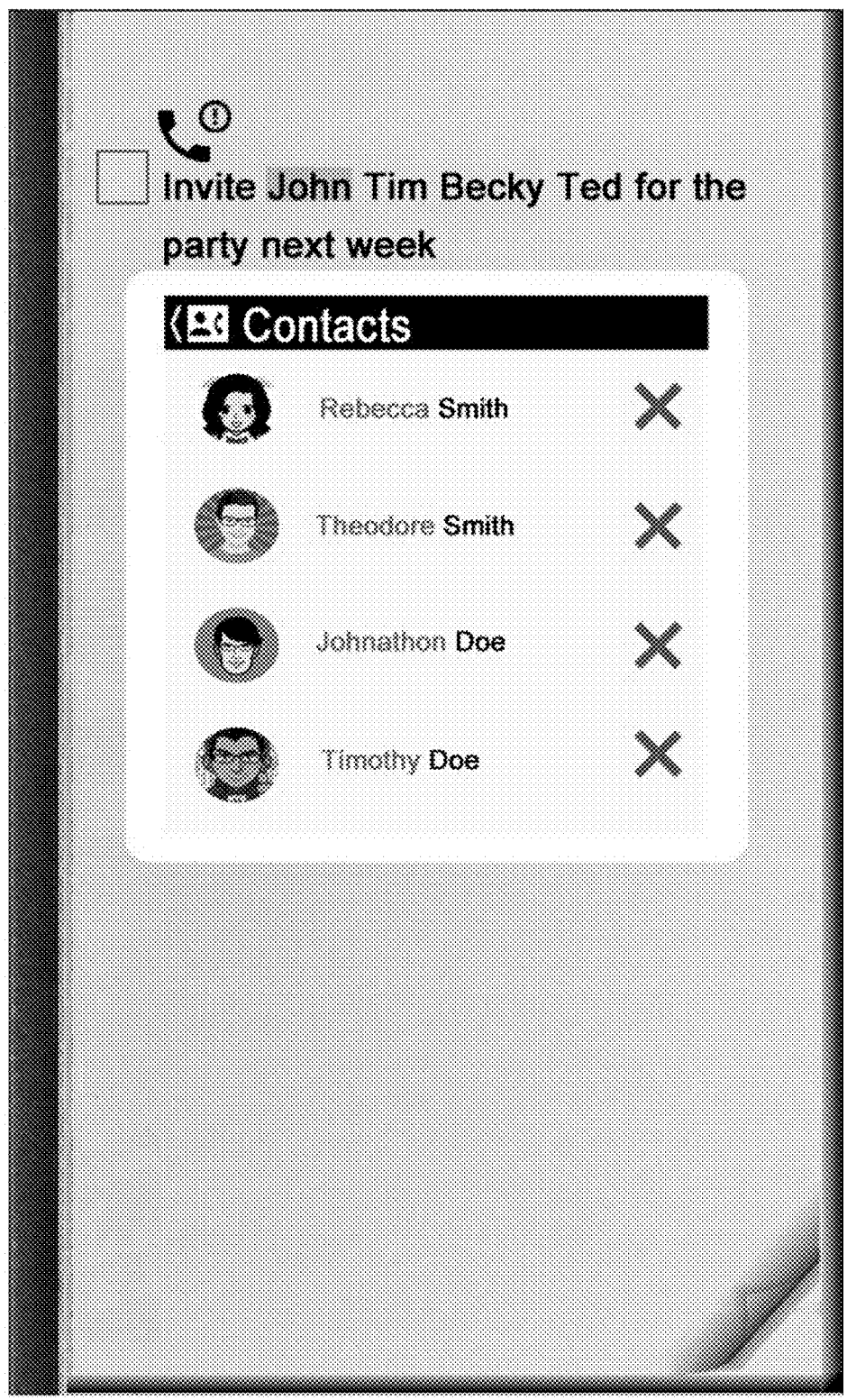
FIG. 4 is an illustrative representation of mobile device screen shot showing a contact list of multiple parties responsive to a user's input command.

Referring now to FIG. 4, FIG. 4 shows an illustrative representation of mobile device screen shot showing a contact list of multiple parties responsive to a user's input command.

Special Feature #2. Suggesting Alternate Communication Channels

A method of recommending alternative COMMUNICATION ACTIONS (e.g., text someone instead of calling someone) and alternative COMMUNICATION CHAN- NELS (e.g. work directline phone number, mobile phone number, landline phone number, company mainline along with extension) instead of the Communication Action/Channel commanded by the user.

Figure 5:
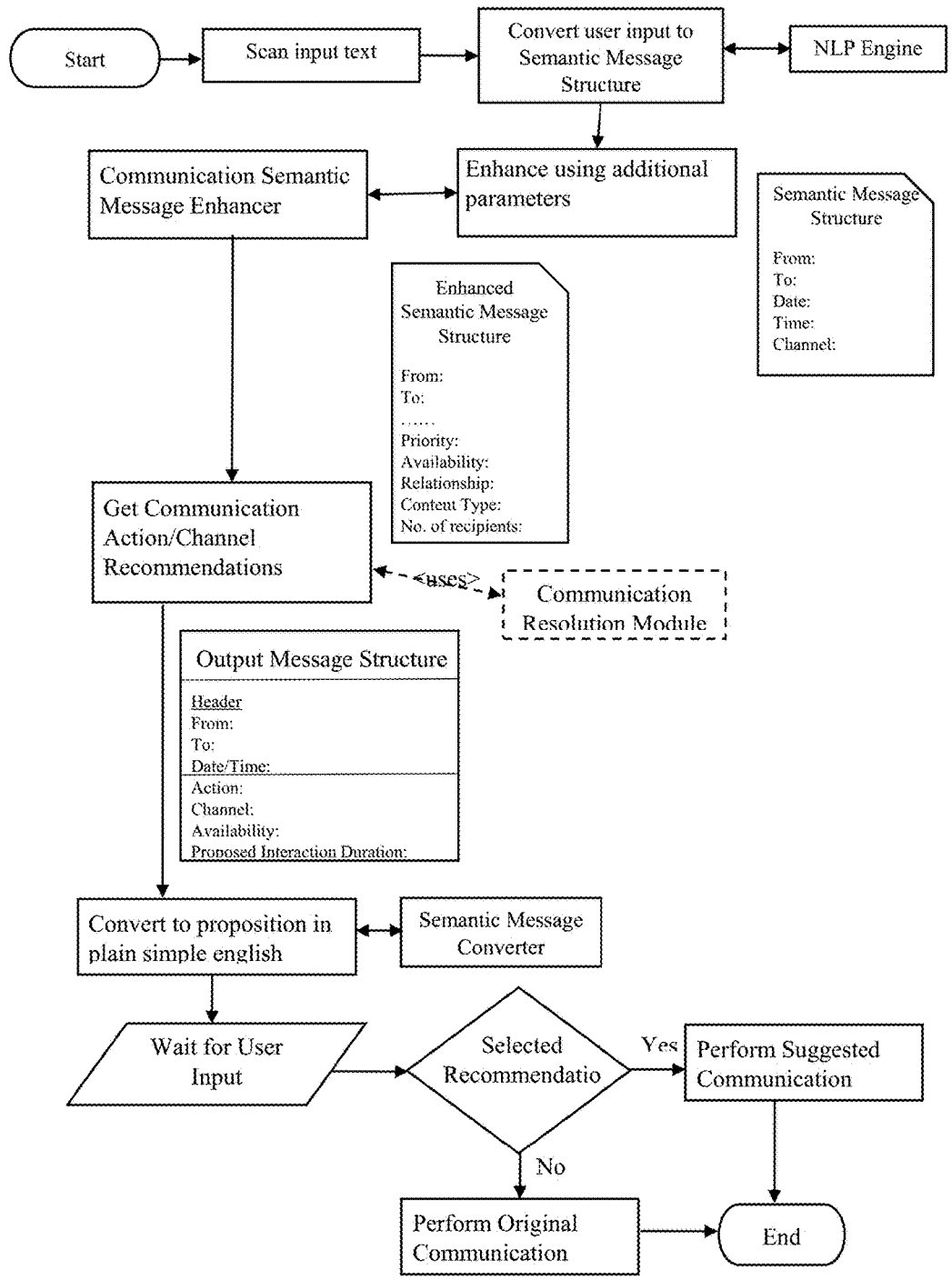
FIG. 5 is a functional block diagram showing one embodiment of an overview of the Alternate Communication Channel module showing computational flow.

Referring now to FIG. 5, FIG. 5 shows a functional block diagram showing one embodiment of an overview of the Alternate Communication Channel module showing computational flow.

Special Method:

This section describes a unique method of detecting/resolving the most optimized communication channel/action for a given recipient based on an algorithm that matches:

The degree of formality: The degree of formality is numerically computed by: (a) The relationship with the recipient e.g. work, personal etc, (b) The degree of separation e.g. a friend would be 1st degree whereas a friend of a friend would be 2nd degree; (c) The previous interaction history with this recipient.

A range of degrees of formality: These degrees of formality are numerically computed for the combination of:

a. The date/time Zone: The date or time at which the user intends to communicate with the user.
   b. The communication action (e.g. call, text)
   c. The communication channel (cell, email etc)

And as a result indicating how appropriate it would be for the user to communicate with the recipient during particular date/time Zone on that Communication channel using that Communication action by means of converting the Semantic Parameters of the proposition into a simple plain English sentence (e.g. it may not be appropriate to call Jason on his cell after 11 pm. Are you sure? Y/N?) using Natural Language Generation techniques.

The Process

1. The user's input is accepted and sent to the NLP Engine which converts it into a Semantic Message Format for the COMMUNICATE action. For example, If the user were to input a text string "call john at 10 pm" then the Semantic Message Structure returned by the NLP Engine is For example:
From: <user>
To: <john>
Date: <current date>
Time: <10 PM>
Channel: <Call>
. . . .

2. It is then enhanced with additional parameters using the Communication Semantic Message Enhancer.

Some of the parameters that are added are:
1. Priority: 0 . . . 5
2. Content: BRIEF, NORMAL, DETAILED, VERY DETAILED (Images), HEAVY (Images, Videos)
3. Schedule: CRISIS, SUPER BUSY, VERY BUSY, BUSY, SOMEWHAT BUSY, PASSIVE ATTENDENCE, FREE
4. ZONE:
Weekdays:
   WORK HOURS: NORMAL (9 AM-5 PM), LUNCH BREAK (1 PM to 2 PM)
   AFTER HOURS (6 PM to 9 PM)
   RESTRICTED HOURS (9 PM to 8 AM)
Weekends:
   OPEN ZONE
   WEEKEND_RESTRICTED ZONE
Vacation/Sick/Travel/
VACATION_DOMESTIC, VACATION_INTERNATIONAL
TRAVEL_DOMESTIC, TRAVEL_INTERNATIONAL
MEDICAL 5. RELATIONSHIP:
WORK: DIRECT REPORT, BOSS
PERSONAL: FAMILY=>WIFE, CHILD, etc.
For example:
From: <user>
To: <john>
. . . .
Priority: 4
ZONE: WORK
Schedule: PASSIVE ATTENDANCE
Relationship: <direct-report>
Content: BRIEF
No. of recipients: 1
. . . .
Description of Parameters
1. Priority The Priority indicates the urgency of the user to get in touch with the recipient. The urgency of the matter can be rated on a scale of 0 to 5 (0 being not at all important, 1 being not important, 2 being important, 3 being slightly urgent, 4 being urgent, 5 being super urgent and time sensitive.)

2. Content

VERY BRIEF represents commands or an action to be performed for example, like a command "Pick up the laundry from the dry cleaners".

BRIEF represents notifying the recipient about an event or to enquire something. MEDIUM represents images that details the message to be given to the recipient. HEAVY represents videos or a lot of images like a photo album.

3. Schedule

For recipients that have a WORK relationship, this Schedule is obtained from an online Calendaring System (e.g. MS Exchange or Apple iCal). For recipients that have a previous exchange of messages over email/sms about their upcoming predicted schedule, the same is extracted from the messages by the NLP engine and converted to a SCHEDULE semantic structure which is stored in a local instance of calendar (Inferred Schedule DB)

is maintained based on previous SMS/Email messages exchanged between the user and the recipient.

4. Zone (Date/Time)

The Zone field is a categorization based on the time, date and the calendar schedule of a person.

The Zone field is the most important field because it directly affects the possible availability of a person. For example, during Week days and the normal (9-5) working hours the category WORK HOURS applies wherein it is assumed that the user will respond to a CALL Action on the Work Communication Channel (work number).

5. Relationship

The Relationship field is important because it gives the relationship that the recipient has with the user.

A relationship has the following types:

WORK: The relationship is professional. A formal channel is usually preferred for communicating with a recipient who has a WORK relationship. There are different types of WORK relationships: DIRECT REPORT, SUPERVISOR, BOSS and HIGHER UP. The higher up the relationship is in the organization hierarchy the more formal the communication channel needs to be.

There are also degrees of separation in a WORK relationship.

1st degree: An immediate relationship like Supervisor or direct report.

2nd degree: The Supervisor's boss, or boss's boss or the junior of a direct report.

Figure 6:
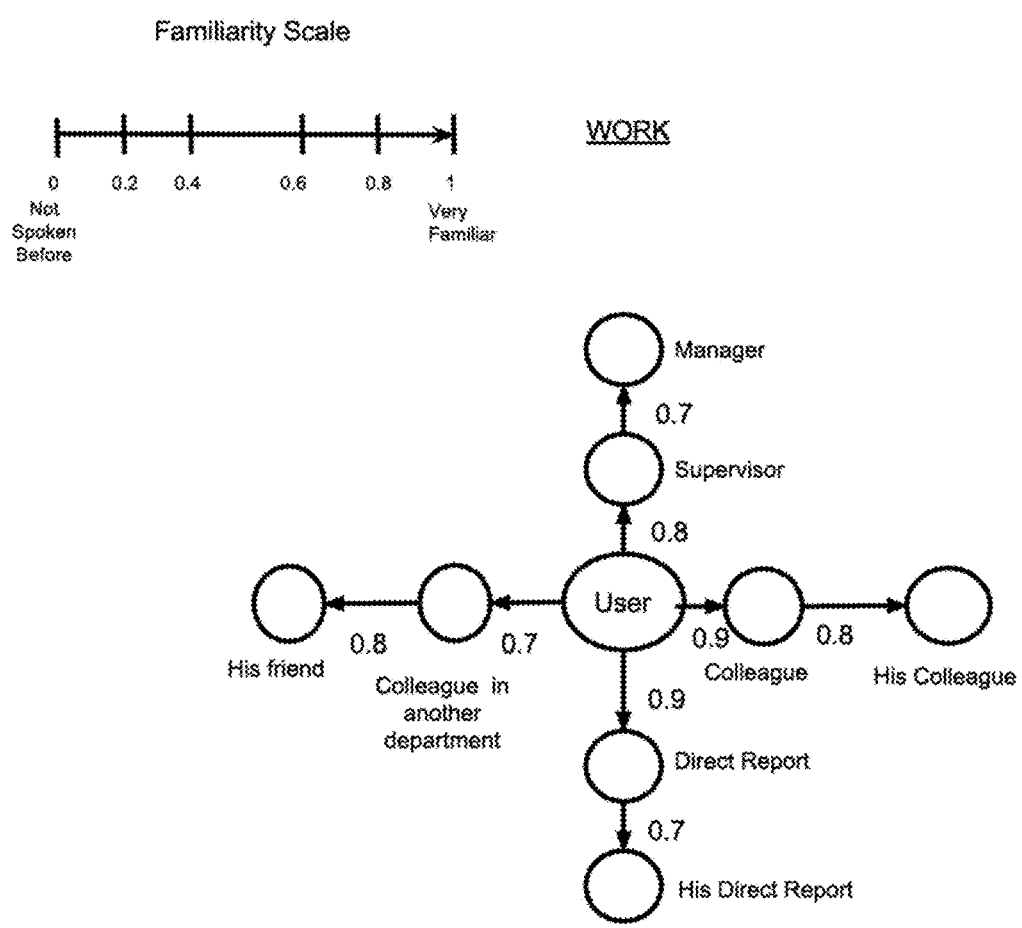
FIG. 6 is an illustrative logical representation of the decision-making parameters of the familiarity scale to identify hierarchical relationships in the messaging context.

Referring now to FIG. 6, FIG. 6 shows an illustrative logical representation of the decision-making parameters of the familiarity scale to identify hierarchical relationships in the messaging context The diagram illustrates the familiarity scale for a WORK relationship. The familiarity scale ranges from 0-1 where 0 means unknown or never spoken to and 1 means very familiar.

Each edge (connecting line) between two nodes represent the familiarity score between those two connections. For example, 0.8 between the user and his supervisor and 0.7 between the Supervisor and his Manager.

Each node (circle) in the diagram represents a connection with the user.

Each new node/connection represents a new degree of separation. Eg. Supervisor is at the 1st degree of separation and the supervisor's manager is at a 2nd degree of separation.

The Cumulative Familiarity Score from the user to a contact at Nth degree of separation is calculated as:

$$CFS=FS01 \times FS12 \times FS23 \times FS24 \times \ldots \times FS(N-1)N$$

$$CFS=\Pi(i=1 \text{ to } N)FS(i-1)i$$

Where $FS(i-1)i$ represents the familiarity score of a connection at the ith degree of separation.

The assumption here is that if person A is connected to person B and person B is connected to person C and then person A is introduced to person C via person B, the contact of person C is in the phone book of person A.

Figure 7:
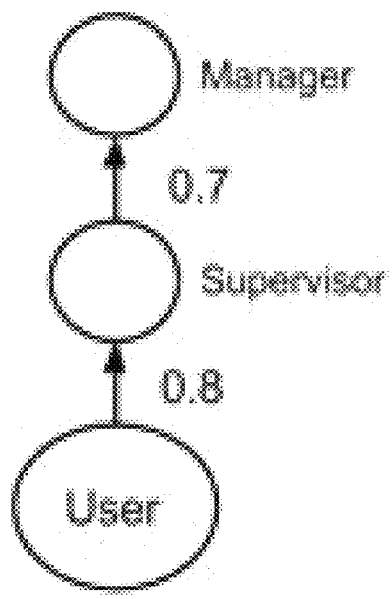
FIG. 7 is an illustrative logical representation of the decision-making parameters of the familiarity scale showing detail of work relationships.

Referring now to FIG. 7, FIG. 7 shows an illustrative logical representation of the decision-making parameters of the familiarity scale showing detail of work relationships In the above diagram, the familiarity score between the user and his supervisor is 0.8 meaning the user and his supervisor communicate frequently with each other. Also, the familiarity score between the supervisor and his manager is also 0.8 which again means that the user's supervisor and his manager also communicate frequently with each other.

Hence the cumulative familiarity score of the user with the supervisor's manager who is at the 2nd level of separation is:

$$CFS=FS01 \times FS12=0.8 \times 0.7=0.56$$

Figure 8:
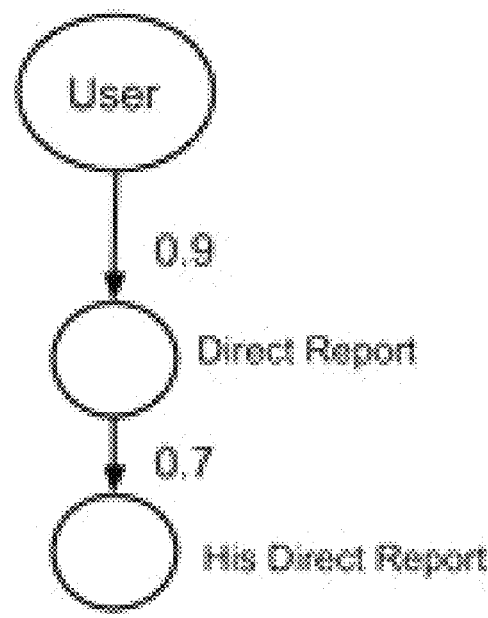
FIG. 8 is an illustrative logical representation of the decision-making parameters of the familiarity scale showing detail of work relationships.

Referring now to FIG. 8, FIG. 8 shows an illustrative logical representation of the decision-making parameters of the familiarity scale showing detail of work relationships Also, the familiarity score between the user and his Direct Report is 0.9 and the familiarity score between the Direct Report and his Direct Report is 0.8 hence the cumulative familiarity score of the user with the Direct Report's Direct Report who is at the 2nd level of separation is:

$$CFS=FS01 \times FS12=0.9 \times 0.7=0.63$$

These degrees of separation and familiarity have a direct impact on whether you can call them at any given odd hour on their cell phone I.e. a really personal device (which indicates a degree of informal-ness) VS calling them on the mainline and then dialing the extension during BUSINESS HOURS OR dropping off an email (which might be more suitable for scenarios that have a greater degree of formality).

The Cumulative Familiarity Score can be overridden by the information contained in the Interaction History Database.

For example:

If John and Jeremy are best friends and frequently communicate with each other so their Familiarity Score between them is 1.

John also has another best friend Tom with who he frequently communicates and so the Familiarity Score between them is 1.

Now John introduces Tom and gives him his number. Now for Jeremy the CFS (Cumulative Familiarity Score) corresponding to is calculated as:

$$CFS=FS01 \times FS12=1 \times 1=1$$

But Jeremy and Tom just met and have no previous interaction history and hence the CFS is overridden and set to 0.2 (which means not so familiar).

PERSONAL: The relationship is here is informal and hence a formal channel is not usually preferred for communicating with a recipient who has a PERSONAL relationship rather a Mobile phone is the choice. There are different types of PERSONAL relationships: FAMILY (WIFE, CHILD etc.), FRIEND. And again in within PERSONAL relationships we have different degrees of separation:

1st degree: A direct family member, for example wife, children, parents or a friend.

2nd degree: An indirect family member relationship, for example, a friend of a friend or a close friend of a family member.

Figure 9:
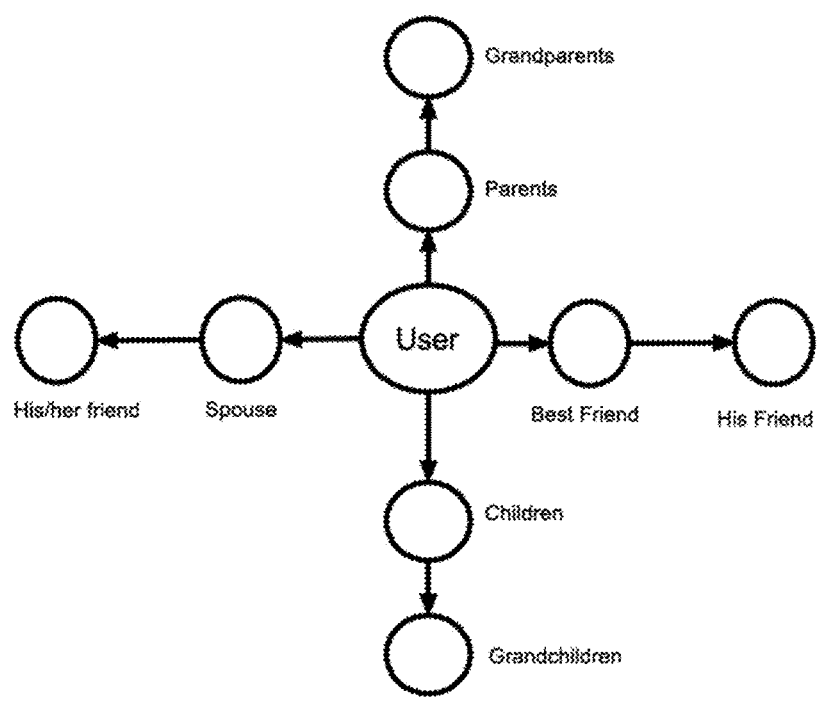
FIG. 9 is an illustrative logical representation of the decision-making parameters of the familiarity scale showing detail of personal relationships.

Referring now to FIG. 9, FIG. 9 shows an illustrative logical representation of the decision-making parameters of the familiarity scale showing detail of personal relationships The diagram illustrates the various degrees of separation where the closest node (circle) is at the 1st degree of separation, the one next to it is at the 2nd degree of separation and so on.

These relationships and their various degrees of separation can affect the suggested communication channel for example, you are less likely to call the CEO of a company that you're working for and would rather send an email. However, if the relationship is a friend, then you are more likely to call for even petty things.

Every Date/Time Zone/Action/Channel Combination has a degree of formality associated with it.

For example:

WEEKEND/CALL/CELL—Very informal/familiar→0.8 to 0.9 (Familiarity Score)

Calling someone on his cell phone on a Weekend (WEEKEND/CELL/CALL) is informal.

RESTRICTED/CALL/CELL—Extremely informal/familiar→0.99 (Familiarity Score)

And calling him on his cell phone during Restricted Hours (RESTRICTED HOUR/CELL/CALL) like after 11 PM is very informal. You really need to be close to the recipient to call him in the middle of the night.

BUSINESS_HOURS/CALL/MAIN LINE—Not so familiar→0.0 to 0.2 (Familiarity Score)

On the other hand, calling someone on their Mainline during Business Hours (BUSINESS HOURS/MAINLINE/CALL) is very formal because you don't even have the direct landline and hence you may not even know that person that well. This is for example calling a mechanic or doctor/dentist.

The Enhanced Semantic Message Structure is then sent to the Communication Resolver Module which recommends a communication action, channel, channel ID and interaction duration based on the approach described in the flow described below.

UNIQUE Features:

The inference engine suggests proposed ACTION/CHANNEL and predicted AVAILABILITY using common sense rules but that can be overridden by the interaction history module which use statistical evidence (previous experience and behavioral and response patterns of the recipient). That combined with contextual information i.e. schedule info derived from user's previous sms/email messages using the NLP Engine provides a 3 way unique combination.

Another aspect is the Personality Judgement Module which again monitors the user's behavioral patterns to select a high level strategy based on either the urgency of the matter vs schedule of the recipient.

Figure 10:
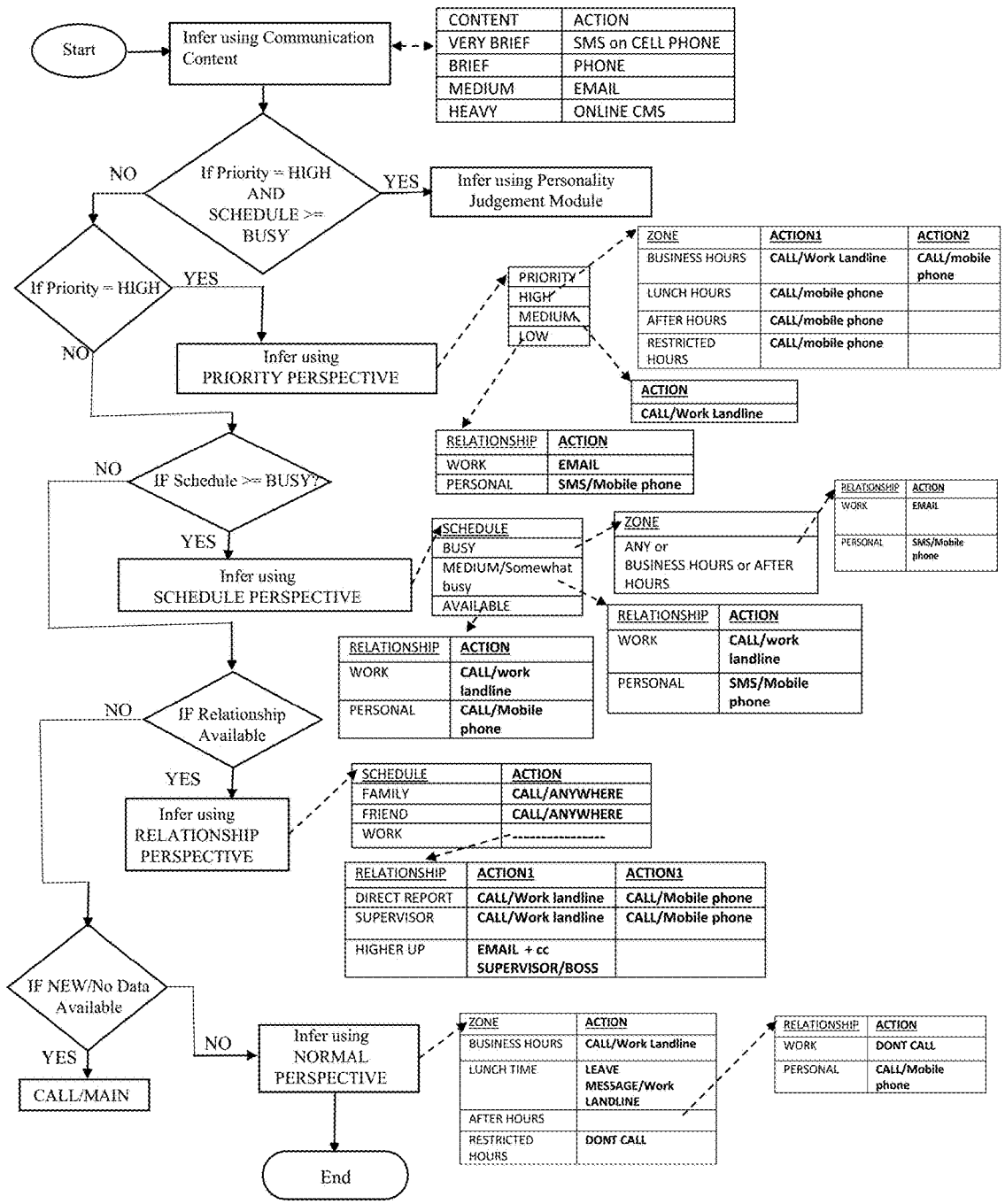
FIG. 10 is functional logic block diagram showing one embodiment of the inference engine showing computational flow.

Referring now to FIG. 10, FIG. 10 is functional logic block diagram showing one embodiment of the inference engine showing computational flow. Note: The rows of the table in the above flowchart represent the rules of the engine.

Technical Architecture of the Communication Resolution Module

Figure 11:
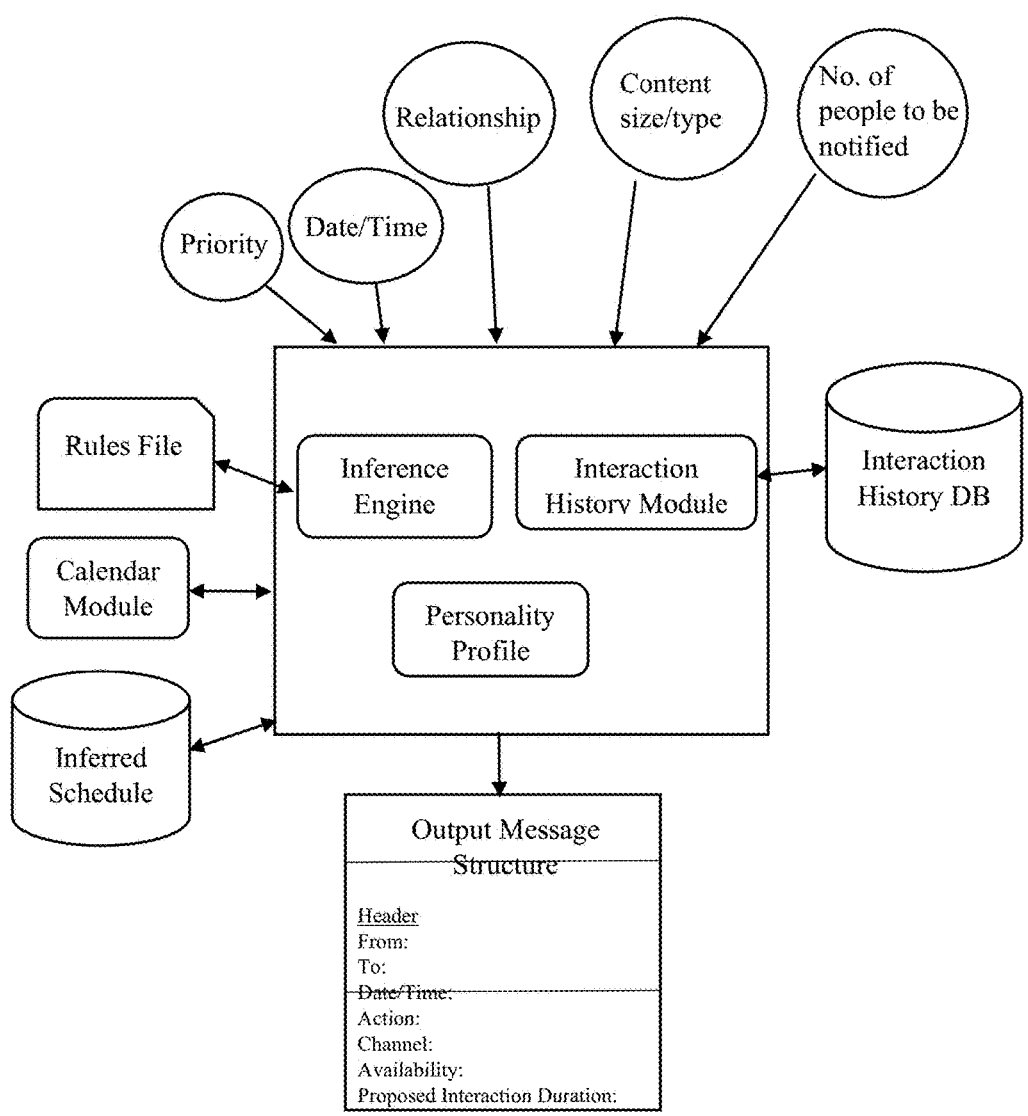
FIG. 11 is a functional block diagram showing one embodiment of the technical architecture of the communication resolution module.

Referring now to FIG. 11, FIG. 11 is a functional block diagram showing one embodiment of the technical architecture of the communication resolution module.

Calendar Module: The Calendar Module allows getting the Schedule of recipient. For recipients that have a WORK relationship, this Schedule is obtained from an online Calendaring System eg. MS Exchange or Apple iCal. For recipients that have a PERSONAL relationship, a local instance of calendar is maintained based on previous SMS/Email messages exchanged between the user and the recipient. e.g. if the user has received a message from a recipient, John Smith: "I am busy. I have a meeting from 4 to 5 pm today" this information is passed to the NLP Engine and the Semantic Message Structure of type SCHEDULE is returned back.

For example:

| | |
|---|---|
| Name: <recipient_name> | Name: John Smith |
| Event: <event_type> | Event: Meeting |
| Event Date: <date> | Event Date: Today's Date |
| Event Start Time: <start_time> | Event Start Time: 4 PM |
| Event End Time: <end_time> | Event End Time: 5 PM |

Based on this Schedule Semantic Message Structure the schedule data is populated in the Local inferred Scheduled Database in the user's mobile device. This also works for WORK connections but the source of the information in this case is note an online calendaring system.

Interaction History Module: The Interaction History Module stores the history of the previous interactions with the recipient in the Interaction History Database in the format:

| Recipient name | Date | Time | Available | Call Duration | Action Performed | Channel Used | Call Back Response Time |
|---|---|---|---|---|---|---|---|
| Bob Smith | Wednesday | 11 PM | No | 3 mins | Call | Mobile | — |

In the above example format, the Call Duration is only applicable if the recipient received the user's call similarly, the Call Back Time refers to the time that the recipient took to return the user's call and is only applicable if he didn't receive the user's call the first time.

The Interaction History Module uses this history information to look at the frequency e.g. within a particular time zone (MORNING BUSINESS HOURS 9 TO 1, LUNCH HOURS 1 TO 2, AFTERNOON BUSINESS HOURS I.E. 1 TO 4. EVENING BUSINESS HOURS 4 TO 6, AFTER HOURS 6 TO 9 RESTRICTED HOURS 9 PM to 8 AM) there is a 50% chance of the recipient answering his cell phone or during 2 to 5 i.e. work hours there is a 90% chance of the recipient answering his work landline.

This information can in certain cases be used to override the suggestion which was made by the Inference Engine.

For example, although the Inference Engine infers that since it's past 11 PM and this is the RESTRICTED zone and it may not a good idea to call at that hour, the Interaction History Module might observe the pattern that 80% of the time that a call was made to this recipient after 11 PM, he has received the call and hence this overrides the suggestion by the Inference Engine.

Personality Profile: The Personality Profile contains information regarding which Perspective the user prefers. If there is a conflict between a priority perspective and schedule perspective for example: If the user calls the recipient during work hours, knowing that the schedule of the recipient is busy, the Schedule Perspective recommends using an EMAIL but the Priority Perspective recommends using a CALL/Work Landline. The recipient in this case may be having a DIRECT REPORT relationship and so might prefer prioritizing his own schedule over the recipient's schedule and still calls. The system learns from this behavior and develops the Personality Profile for this user i.e. whether the user is expected to exhibit his character trait/personality of giving more importance to his own priority/sense of urgency of getting the message communicated or respecting the tight busy schedule of the recipient. So the next a decision has is made on this using previously exhibited behavior classified by date/time zone.

Communication Resolution Module Flow

First, depending on the content the appropriate Communication Action is chosen:

| CONTENT | ACTION |
|---|---|
| VERY | SMS ON CELL |
| BRIEF | PHONE |
| BRIEF | PHONE |
| MEDIUM | EMAIL |
| HEAVY | ONLINE CMS |

If there's a very brief/short message to be conveyed to a recipient (CONTENT: VERY BRIEF) for example, like a command "Pick up the laundry from the dry cleaners", then sending a SMS on the Mobile phone of the recipient is chosen.

If the content of the message to be conveyed to a recipient is BRIEF for example, to ask about something or to notify about something, then the PHONE Communication Action is chosen.

If the content is MEDIUM for example, if the content contains a few images that detail the message to be given to the recipient, then the EMAIL Communication Action is chosen.

If the content is HEAVY for example, if the content contains videos or a lot of images like a photo album, then an ONLINE CMS (for example Google Drive or Dropbox) is chosen as the Communication Action.

Conflict Between Priority Perspective and Schedule Perspective

Condition: Then in case the Communication Resolver finds that there's a conflict between the Priority of the communication and the Schedule of the recipient i.e. the Priority is Urgent (or Super Urgent) and at the same time the Schedule of the recipient is Very Busy (or Super Busy or Crisis), the conflict is resolved by the Personality Judgment Module which takes a decision based on the character trait/personality of the user. i.e. whether he thinks of his own priority more than the schedule of the recipient he is communicating with.

Priority Perspective

Condition: If there's no conflict, and the Priority of the communication is Urgent or Super Urgent, the communication is handled on a Priority Perspective.

In the PRIORITY PERSPECTIVE there are 3 situations depending on the date/time zone:

Normal Business Hours (ZONE: BUSINESS_HOUR): During this time, a recipient is expected to be at his desk and hence the user e.g. a colleague (RELATIONSHIP: WORK) would call on the WORK Landline to deliver a high priority message. If for some reason the user is not at his desk for example, taking a break, the 2nd option is the Mobile phone.

This may vary if the relationship is personal (RELATIONSHIP: PERSONAL), the user may want to call the recipient who may be a family member on his Mobile phone first and then if he doesn't get through, try calling the WORK Landline.

After Work Hours (ZONE: AFTER HOURS): During this time, a recipient may typically not available at his desk and hence any caller (regardless of the relationship) would not call on his Work Landline but instead calls on his Mobile Phone.

Night Time (ZONE: RESTRICTED HOURS): During this time, a recipient is generally either asleep or should not be disturbed however since this is a Priority it would be OK to call on the Mobile Phone.

The result obtained from the Priority Perspective can be overridden by the Interaction History Module if it suggests a different Action/Channel based on the previous history information stored for this recipient.

Schedule Perspective

Condition: If the priority of the communication is not Urgent or if it's not available, the Schedule of the recipient is looked at next. If the recipient's schedule is Very Busy or Super Busy or Crisis the communication is handled based on a Schedule Perspective.

In the Schedule Perspective there are 2 situations depending on the Relationship with the recipient:

Work Relationship: If the relationship with recipient is Work related then since the recipient is Very Busy it wouldn't be right to call them and hence an Email option is suggested. Sending a text message might not be formal, especially if the type of the work relationship is Boss or some other Higher Up position.

Personal: However, if the relationship with the recipient is Personal and since the recipient is Very Busy sending an SMS on the Mobile phone of the recipient would be the best choice. For example, sending an SMS to a friend is much more common (and faster in response) than sending an email.

The result obtained from the Schedule Perspective can be overridden by the Interaction History Module if it suggests a different Action/Channel based on the previous history information stored for this recipient.

Relationship Perspective

Condition: If the priority of the matter is not high AND the schedule of the recipient is not Busy (or Very Busy) or if the Schedule is not known then the matter is considered to be normal/casual.

Under such circumstances, the default tendency is to focus on the Relationship with the recipient, hence the communication is handled based on a Relationship Perspective.

In the Relationship Perspective there are 3 situations depending on the nature of the relationship.

Family or Friend: If the recipient is a family member and since the schedule of the recipient is either not Very Busy or not available at all, calling would be the simplest and fastest way to communicate regardless of the date/time zone and regardless of the priority.

Work: If however the relationship is work then the Communication Action/Channel is chosen based on the Relationship Type.

If the Relationship Type is Direct Report or Supervisor, calling the Work Landline would be suggested as the first option assuming its Work Hours. If either the recipient doesn't receive the call on the Work Landline (maybe because he's not at his desk) or it's after Work Hours, calling on the Mobile Phone is suggested but only as a second option for example, if the priority is slightly urgent.

If the Relationship Type is Higher Up for example a manager or a Chief Officer, it wouldn't be appropriate to call them rather it would be best to Email them and notify the Supervisor by CC-ing them on the Email.

The result obtained from the Relationship Perspective can be overridden by the Interaction History Module if it suggests a different Action/Channel based on the previous history information stored for this recipient.

Default Perspective

Finally, if the Relationship isn't available and if the Communication to the recipient is New i.e. there's only a name/number given with no correlation to the user's contacts, calling on the Main Line is suggested. For example, calling a dentist or calling a mechanic assuming its Work Hours.

However if the Communication to the recipient is not new but also, neither the Priority is Urgent nor the Schedule of the recipient is Very Busy nor the Relationship is available, the communication is resolved based on a Default Perspective.

In the Default Perspective there are 3 situations depending on the date/time zone:

Business Hours: During business hours the recipient is usually at his desk and hence the Call/Work Landline option is suggested.

Lunch Time: Lunch time is a special case of Business Hours wherein the recipient may or may not be at his desk. Hence, if the recipient cannot be reached leaving a message is suggested.

Restricted Hours: During this time, the recipient is definitely not at his desk but rather asleep or should not be disturbed. Hence it is suggested not to call the number.

The result obtained from the Default Perspective can be overridden by the Interaction History Module if it suggests a different Action/Channel based on the previous history information stored for this recipient.

In all cases (except if the relationship is not known and hence the communication is happening for the 1st time, there's no previous history data available with the recipient), the Interaction History Module is consulted. For example if the user is trying to call the recipient at 10 PM and although the recipient has a relationship of Direct Report or if the Priority is Urgent or Super Urgent, Interaction History Data may clearly show that 90% of the times the recipient never receives a call after 10 PM and hence an alternate communication action/channel is suggested. In this example, the user will be shown the inference that 90% of the times the user has called this recipient after 10 PM he hasn't received the call and is then suggested to send an SMS instead.

The Communication Resolver Module then produces an Output Message Structure. For example if the user enters "Send Jason Smith the marketing documents at 11 PM" The Output Message Structure produced by the Communication Resolver Module is of the format:

From: <user>
To: Jason Smith
Action: Email+SMS
Channel: email_address+mobile phone
Availability: RESTRICTED
Proposed Interaction Duration: NA Assuming that the Relationship is WORK/SUPERVISOR meaning the recipient Jason Smith in this case is the user's supervisor at the workplace and the time is 11 PM it isn't right to disturb him with a call hence a combination of Email+SMS is used.

This is then converted to a proposition in plain simple English using the Semantic Message Converter.

For example:
<<recipient name>>, I wanted to notify you about the <<content>> << >> I <<VERB>> on the <<channel>>

Jason, I wanted to notify you about the marketing documents I sent on the email.

The user is then prompted with this proposition and depending on whether the user chooses to accept this proposition or not, either the suggested communication action/channel is initiated or the original communication action/channel is initiated.

Example 3

If the user adds "Call Jason Smith on his cell". The Channel Resolver Module will recognize that Jason is the user's friend but assuming it's 11 PM so Jason is probably sleeping (based on the previous historical interaction and based on an inference engine rule that says its not ok to call people too late during their sleep hours). The virtual interactive assistant, also called an interactive intelligent agent, animated agent, or animated intelligent agent, will prompt the user to send a text message instead, however the user can ignore this if it is something urgent.

Figure 12:
FIG. 12 is an illustrative representation of mobile device screen shot showing a user's input contraposed to selection options that are provided by the communication resolution module.

Referring now to FIG. 12, FIG. 12 is an illustrative representation of mobile device screen shot showing a user's input contraposed to selection options that are provided by the communication resolution module.

Special Feature #3. Identifying Contact Based on Additional Related Information

The Channel Resolver Module contains a method to disambiguate a partial first name entered by the user based on other miscellaneous information given by the user e.g. a similar area code of the mobile phone number, city and state of the person's address etc) and co-relate it to a corresponding Contact in the Contact Manager of the Mobile device.

Figure 13:
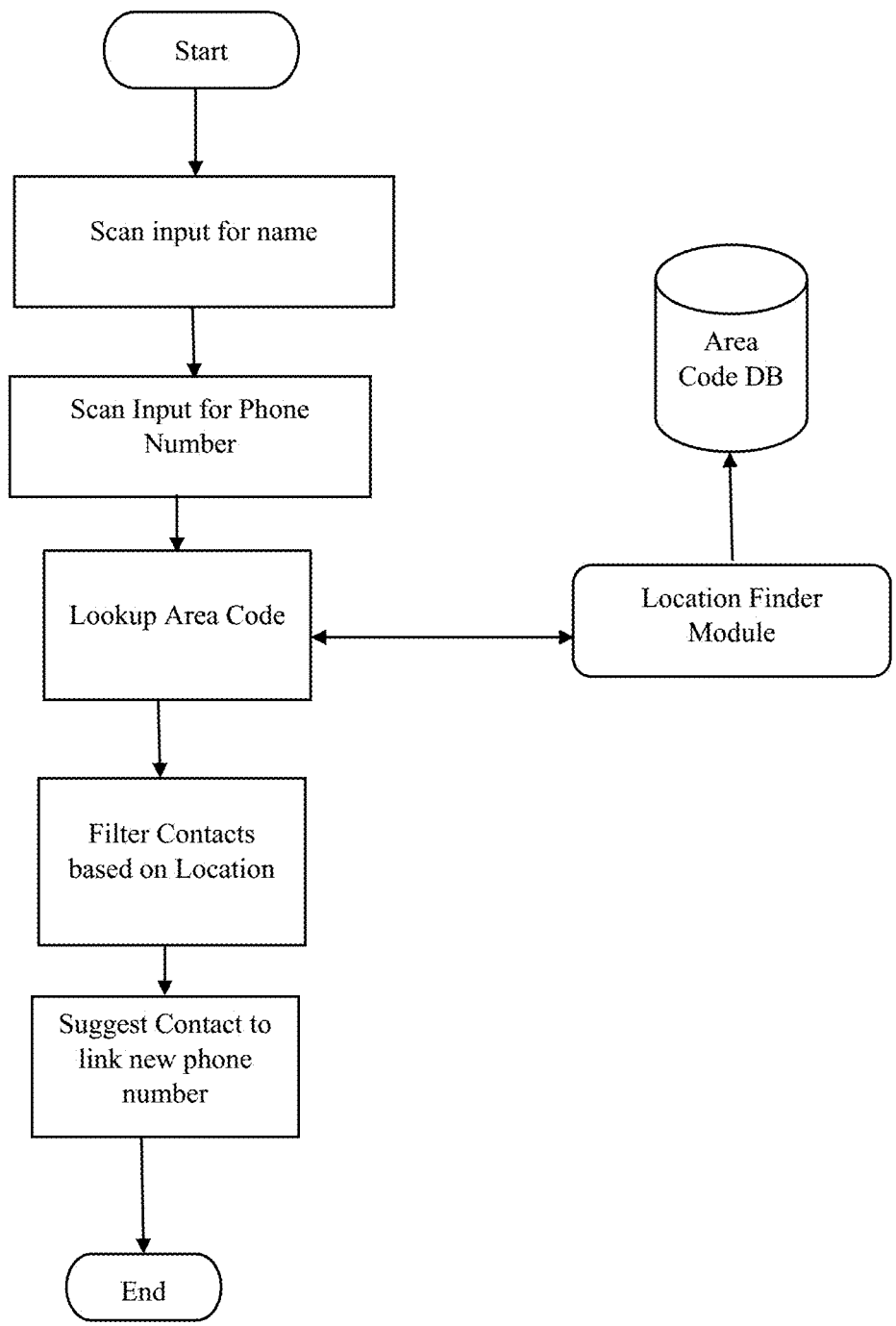
FIG. 13 is a functional block diagram showing computational flow of one embodiment of the person resolution module using alternative additional related information to disambiguate partial user input data.

Referring now to FIG. 13, FIG. 13 is a functional block diagram showing computational flow of one embodiment of the person resolution module using alternative additional related information to disambiguate partial user input data.

Example 4

If the user adds, "Call Jason on his cell number 222-333-4444" the Channel Resolver module understands that the user has directly given the number to dial as well as the contact to associate it with. The Channel Resolver cross references this number with all Jason's in his existing contacts, if the number is not found it checks if there is any single contact entry for Jason which has a number that begins with the area code "222"

If such a unique entry is found assumes it to be the same person and prompts the user to save the number under the contact "Jason". If the user says YES, it will be saved as Jason's Mobile number and will proceed to dialing.

Figure 14:
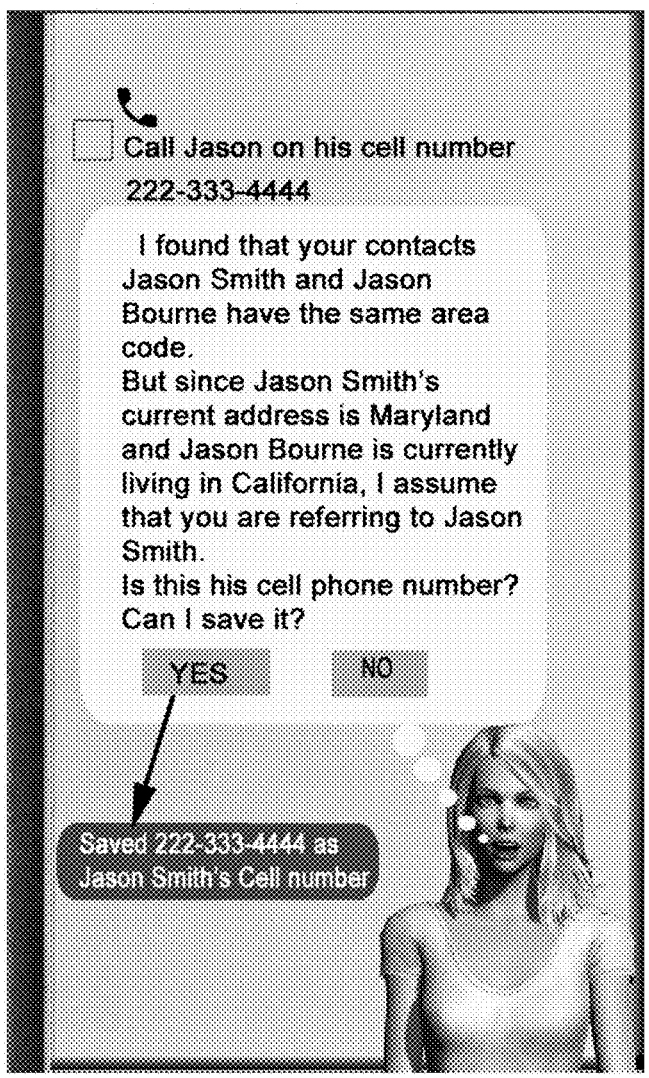
FIG. 14 is an illustrative representation of mobile device screen shot showing two types of user selection options being offered by the communication resolution module.

Referring now to FIG. 14, FIG. 14 shows an illustrative representation of mobile device screen shot showing two types of user selection options being offered by the communication resolution module.

Feature #4. Semantic Message Conversion

The Semantic Message Converter contains method to convert Semantic Message Structure containing
  a. specific Semantic Action such as COMMUNCATION ACTIONs (e.g. text, email, call) and
  b. related Semantic parameters such as recipient name, date, time etc and Sub Semantic Actions such as TOPIC of Message (e.g. Watching a movie, Meeting at starbucks, Attend a birthday party etc)
into a TANGIBLE ACTION that can be performed on a mobile device (e.g. opening email compose screen or opening SMS compose screen with the targeted user/recipient automatically selected from the phone/address book) and
  a SEMANTICALLY CONVERTED MESSAGE (converted from 3rd person to Semantic Message Structure to 2nd person using a Response Template).

The Semantic Message Converter operates based on Semantic Message Structures generated by the Server Side NLP/NLU Engine as shown in the figure.

The Semantic Message Converter operates based on Semantic Message Structures like:
COMMUNICATE
From: <<user>>
To: <<recipient>>
Channel: <<call, sms, etc>>
Topic: MEET
Host: <host name>
Guest: <guest name>
Date: <date>
Time: <time>
Location: <place>

Here the outer rectangle represents the Communication Structure and the inner rectangle is specialized for topics/events such as Meetings, Movies or Parties.

Once the Semantic Message Data Structure is prepared the Semantic Message converter converts the message from 3rd person (e.g. invite Tom) to 2nd person (I am inviting you).

Example 5

In the example below the application associates the sentence "Text Jason Smith about watching Spiderman at AMC tonight at 9" to sending this SMS to Jason Smith i.e. a contact person on the user's contact book after converting the message from 3rd person to a 2nd person:

"Jason, Do you want to watch the movie Spiderman at AMC theaters at 9 PM tonight?"
COMMUNICATE
Sender: <<user>> e.g. John
Recipient: <<recipient name>> e.g. Jason Smith
Channel: <<Cell no>> e.g. 111-222-3333
Topic: MEETING
  Host: John
  Guest: <<recipient>> e.g. Jason Date: <meeting date> e.g. today
Time: <meeting time> e.g. 9 pm
Location: <<venue>> e.g AMC
Purpose:
MOVIE
Action: watch
Name: <<Movie name>> e.g. Spiderman
Theatre: <<theatre>> e.g. AMC
Time: <<Showtime>>
Duration: <<duration>>

Here the Semantic Message Structure is nested one inside the other, as generated by NLP Engine.

Here the outer rectangle represents the Communication Structure (Semantic Message Structure) and the inner rectangle is specialized for topics/events such as Meetings, Movies or Parties (internally nested Semantic Message Structure). Please note that such Semantic Message Structures (nested or otherwise) are created by passing the user input sentence e.g. "text Jason about meeting at AMC today at 9 pm to watch Spiderman" to the NLP/NLU Engine.

The Next Step includes converting Semantic Message Structure (nested or otherwise) into Response Templates by the Semantic Message Converter.

The Response Template has place holders for every variable field e.g. <<recipient name>>, <<movie name>>, <<date>> etc. (all the variables are represented by double left and right arrows i.e. <<, >>)

These place holders are mapped to the field names in the Semantic Message Structure (the mappings are shown in the figure).

Some mappings also include a procedure e.g. to convert the name to only the first name, convert the person name to a pronoun.

Such transformations make it possible to convert the Semantic Message Structure to a 2nd person sentence.

Figure 15:
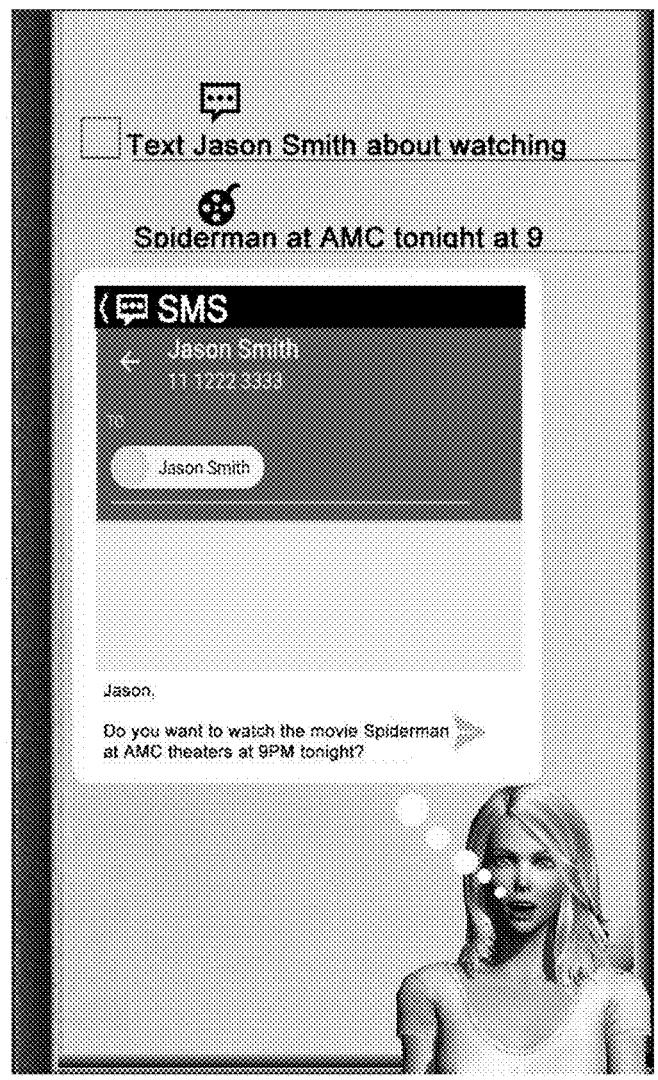
FIG. 15 is an illustrative representation of mobile device screen shot showing an example of the semantic message conversion.

Referring now to FIG. 15, FIG. 15 shows an illustrative representation of mobile device screen shot showing an example of the semantic message conversion.

Semantic Actions

Semantic Actions can be grouped under two major categories:

Communicate Actions

1. A Call Action: Keywords like "Call" in relation to a Contact object (mentioned earlier) will get recognized as a Call action. If the number to dial is specifically mentioned like in example 2, the number is automatically linked to the call action. However in case there are multiple numbers available for a particular Contact object, the application will prompt the user to choose the desired number of the contact on the user's phone.

2. A Text Action: Keywords like "Message" or "Text" in relation to a Contact object will get recognized as sending a Text Message action.

3. A Email Action: Keywords like "Email" or "Send" get recognized as an email action. The application also recognizes keywords like "document" or "photos" to try and guess the email address of the Contact object. For example, sending documents would usually be done through a company email address, while sending photos would usually be done through a personal email address.

4. A Notify Action: Keywords like "Check with" or "ask" or "invite" in relation to a Contact object will get recognized as a notification action. The Channel Resolver module then chooses the best channel of communication i.e. A Text Message or An Email or A Call to notify the contact. This is shown in example 5.

Navigate Action

Keywords like "Go to" or "Drive to" or "Visit" or "Hang out at" will get recognized as navigate action and will work together with the Place object and one or many route objects (mentioned earlier). This can be seen in example 4.

Entities/Concepts:

Entities are usually nouns like a name of a person or place. Actions work upon entities.

1. A Person: An explicitly stated name of a person (first name or last name or both) will get recognized as a person entity. If an exact match is found, the application will directly link to it. However, if there is an ambiguous name the application will prompt the user to choose the desired contact from the user's phone. This is demonstrated in example 1.

Also if a person is implicitly state for example "My Boss" or "My Wife" will get recognized as a person entity.

2. A Contact: A contact is a specialization of a person entity. A contact has a definite relationship with the user for example, a friend, colleague or family member. A person on the other hand might not have a relationship with the user, for example an actor in a movie.

3. A Location: A noun resembling a place on a map or a place in relation to a person. For example:

1. "John F. Kennedy International" will automatically get recognized as an airport.

2. "Bob's home" will get recognized as the home address of Bob who is a contact on the user's phone. This can be seen in example 4.

4. A Route: Keywords like "through the highway" or "via 21st Street" will get recognized as part of a route to a place. This works together with the place object (mentioned earlier). This can be seen in example 4.

5. A Message: The Semantic Message Converter module recognizes keywords which can act as templates to generate a text message to the Contact. Instructions like "Message Bob there's a the delay in shipment" automatically generate a text message with the context like "Hi Bob, There is a delay in the shipment." This is shown in example 3.

A message can be sent to multiple channels like email, SMS or a phone call.

6. A File/Folder: Keywords like "document" or "photos" or "pictures" get recognized as files or folders on Google Drive. The application recognizes the file or folder name to search for based on the context. For example, with "My 28th birthday party photos" the application recognizes the file/folder name "28th birthday party photos" and performs a search on Google Drive to find possible matches. If an explicit match is found, the application directly links to it. However if there are multiple matches found the application will prompt the user to select the desired file/folder to be linked.

Example 6

Similarly if the user adds "Email Jason Smith about tomorrow's meeting at Starbucks at 7 PM", the channel resolver understands that the user wants to send an Email to his contact Jason Smith (on his email address). Using the Semantic Message Converter The virtual interactive assistant sends the message "Jason, Reminding you about our meeting at Starbucks tomorrow at 7 PM" to Jason with the Subject "Meeting".

Figure 16:
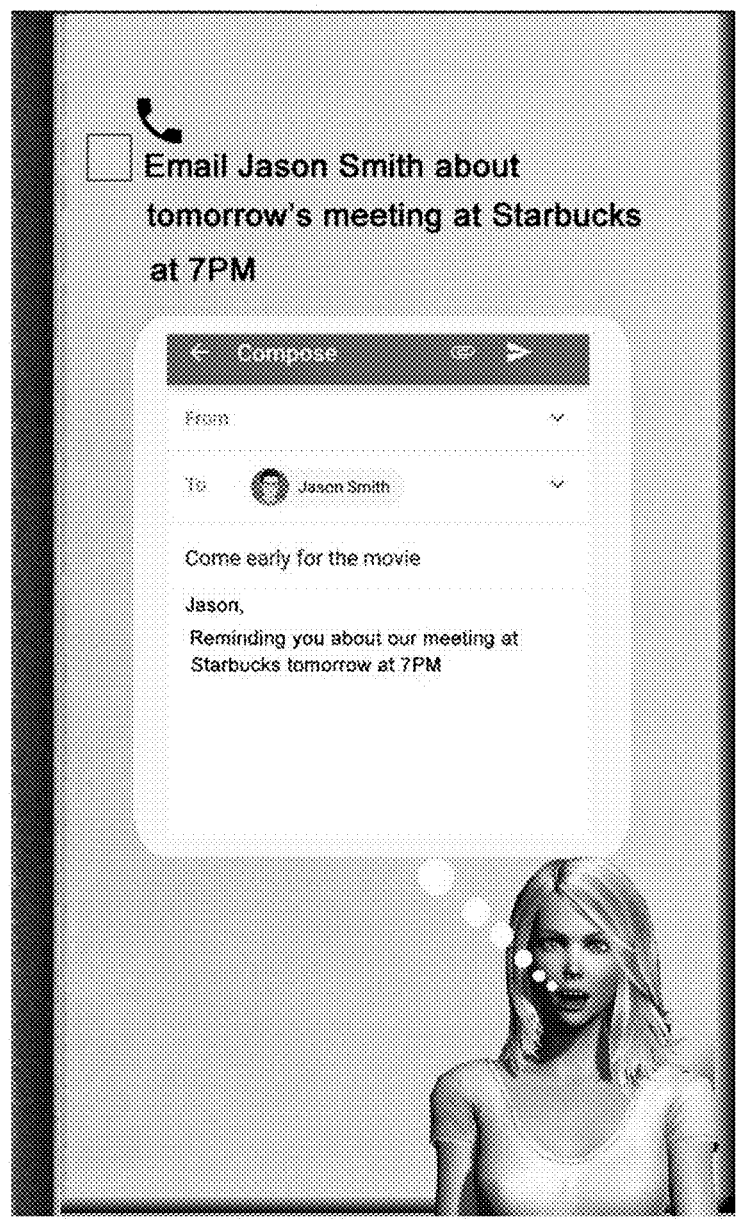
FIG. 16 is another illustrative representation of mobile device screen shot showing an example of the semantic message conversion.

Referring now to FIG. 16, FIG. 16 is another illustrative representation of mobile device screen shot showing an example of the semantic message conversion.

Example 7

If the user adds "Tell Simon to pick up the laundry from ABC Dry Cleaners", The Semantic Message Converter converts the text to the message "Simon, pick up the laundry from ABC Dry Cleaners". This depicts a command/order type message. Where "Tell <person> to <action>" is recognized as an order.

Example 8

If the user adds "Ask Simon to collect the laundry from ABC Dry Cleaners", The Semantic Message Converter converts the text to the message "Simon, Can you pick up the laundry from ABC Dry Cleaners?". This depicts a Yes/No type question. Where "Ask <person> to <action>" is recognized as a Yes/No question.

Example 9

If the user adds "Ask Simon when he can collect the laundry from ABC Dry Cleaners", The Semantic Message Converter converts the text to the message "Simon, When can you pick up the laundry from ABC Dry Cleaners?". This depicts a What/When/Where type question. Where "Ask <person> what/when/where <action>" is recognized as a What/When/Where question.

Example 10

If the user adds "Inform Simon that I have collected the laundry from ABC Dry Cleaners", The Semantic Message Converter converts the text to the message "Simon, I have picked up the laundry from ABC Dry Cleaners". This depicts a notification type message. Where "Inform <person> that <action performed>" is recognized as an notification message.

Special Feature #5. Complementing Underspecified Input with Missing Parameters Using General Knowledge The User Input Complement Module contains a method to automatically complement insufficient partial user input string containing an action/task to be remembered/taken by prompting the user for un-specified parameters (e.g. date, time, location, person(s) etc) based on general knowledge/common sense rules. This is shown in example 7.

Example 11

If the user adds "Invite bob to my birthday party next week" the Semantic Message Converter fills up the data structure as follows:
From: <<user>>
To: Bob
channel:
Topic:
Host <user>
Guest: Bob
Date: <user's birthday>
Time: <missing>
Location: <missing>

The User Input Complement Module detects that the Date, Time and Location of the event is missing. It assumes the date of the party to be the Birthday of the user and prompts the user to enter the other information.

Figure 17:
FIG. 17 is an illustrative representation of mobile device screen shot showing an example of the User Input Complement Module showing the module requesting additional information after identifying underspecified user input.

Referring now to FIG. 17, FIG. 17 is an illustrative representation of mobile device screen shot showing an example of the User Input Complement Module showing the module requesting additional information after identifying underspecified user input.

Special Feature #6. Abstract Communication Channel Resolution

The Channel Resolver Module contains a method to interpret/convert abstract COMMUNICATION ACTIONS mentioned in the user input instructions (e.g. check with, notify, communicate, contact, get in touch with etc) to the most optimized combination of COMMUNICATION ACTION (e.g. call, email, text) and COMMUNICATION CHANNEL (e.g. email id, mobile/work/home phone numbers etc) based on a number of criteria including:
1. Time of day: work hours, early morning etc.
2. Day of the week: weekday, weekend etc.
3. Relationship with the contact: work colleague, friend, family member etc.
4. Priority of the message.
5. Previous interaction history indicating the communication channels history preferred by the recipient.
6. Number of people to be notified.
7. Prompt/nature of response expected.
8. Content size/nature
9. Content type eg. an image If it's a call action, The Channel Resolver uses the above parameters to decide which number to call on.

If the relationship is personal calling the home number before 8 AM and after 7 PM is suggested.

If calling during business hours (9 AM-6 PM) and during travel time (8 AM-9 AM and 6 PM-7 PM) or during lunch time (1 PM-2 PM) then calling the mobile is suggested.

Also, if the time is past 11 PM the text option is suggested instead of a call.

If the relationship is work related then the work number is chosen during work hours.

Only if the priority of the matter is high, the mobile number is suggested. The home number is not suggested.

Example 12

In the example below the application associates the sentence "Check with Jason whether he can watch Spiderman at AMC tonight at 9" to notifying the contact Jason via a sms message.

In this example Jason is a friend and the user texts him frequently to ask things so, the recommended action is a "SMS". But if the movie were to start 1 hour from then then the recommended action would be "CALL" on the Cell number.

Figure 18:
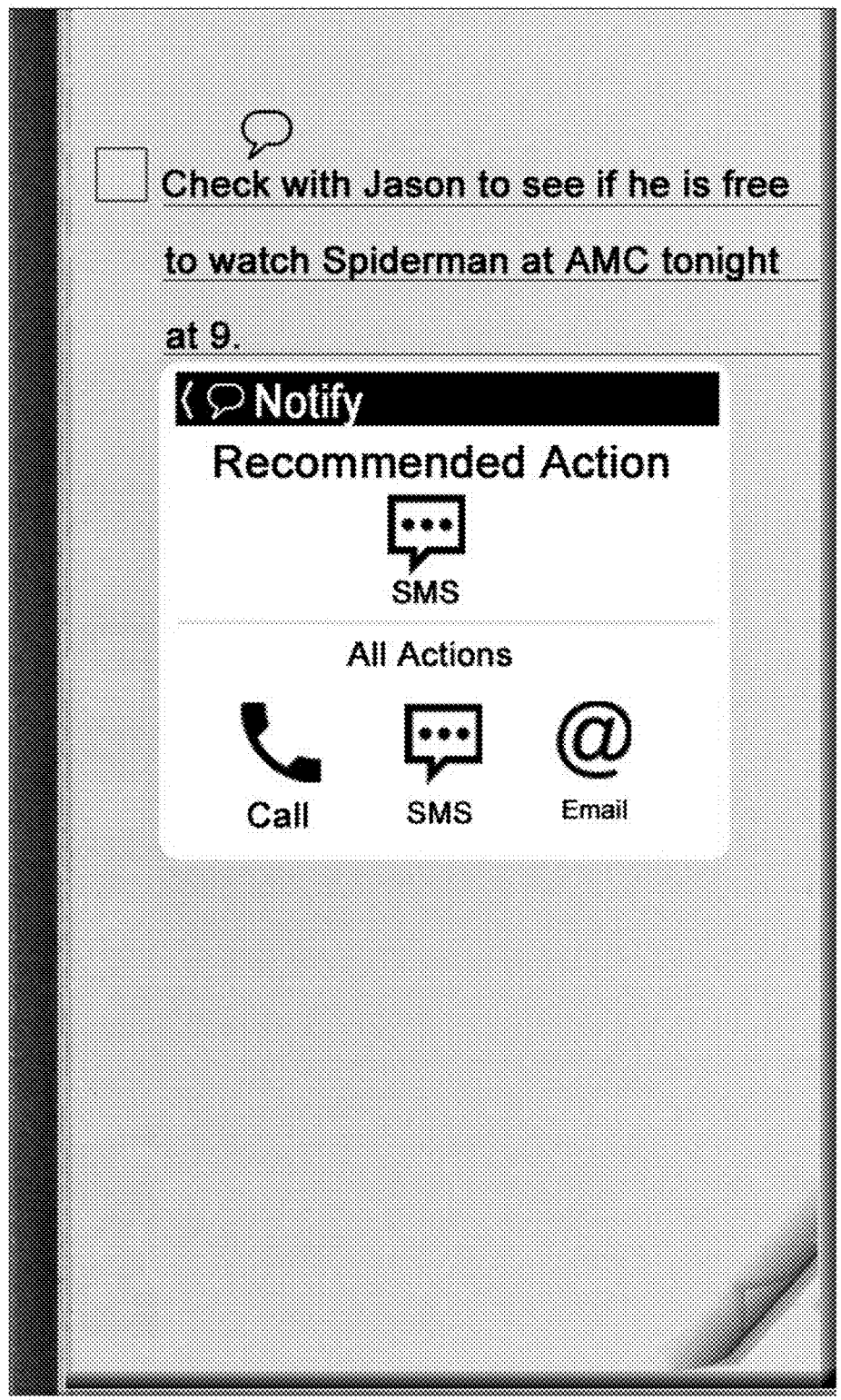
FIG. 18 is an illustrative representation of mobile device screen shot showing an example of the Abstract Communication Channel Resolution process of the Channel Resolver Module providing multiple types of options to a user.

Referring now to FIG. 18, FIG. 18 is an illustrative representation of mobile device screen shot showing an example of the Abstract Communication Channel Resolution process of the Channel Resolver Module providing multiple types of options to a user.

This popup contains the recommended way and alternate ways to notify the linked contact at the particular time.

Special Feature #7. Navigation Resolution:

The Navigation Resolver module contains a method to automatically detect NAVIGATE action in a user input sentence and automatically derive/infer the following:
1. Destination of the trip using the Destination Location Resolver Module.
2. Source Location of the trip using the Source Location Resolver.
3. Path/route of the trip (e.g. through highways with or without tolls, local roads etc) based on:
  a. The preferences indicated by the user if any (eg. Navigate to Tom's house using the highway).
  b. The distance across the different routes.
  c. The travel time across the different routes based on traffic patterns.

d. The cost across the different routes if there are routes having tolls.
4. Mode of Transportation (e.g. by walk, drive, train, bus, boat) using the MoT Resolver module based on:
   a. The preferences indicated by the user if any (eg. Go to Tom's house by train).
   b. The distance across the different modes of transportation.
   c. The travel time across the different modes of transportation based on traffic patterns (eg. 3 hours by road and 1 hour by train).
   d. The cost across the different modes of transportation.

The Destination Resolver:

The keywords "Go" or "Navigate" or "Find Directions" trigger the Navigation Resolution flow.

The Destination Location Resolver starts off by scanning the user's input for a destination address.

Once the address is obtained there are 4 possible scenarios:
1. If an absolute address is found, for example "Go to 616 W 24th St, New York, N.Y. 10011, USA" the algorithm proceeds to Address Normalization.
2. If an absolute address is not found, the algorithm checks if an address in relation to a contact is mentioned, for example "Go to Joe's place". If it finds this, it extracts the address from the contact's details and proceeds to Address Normalization.
3. The algorithm tries to match the obtained address with a standard set of address formats. For example, "abc Street and Nth Avenue" would mostly refer to an address in New York. If such a match is found, the algorithm fills in the missing gaps of city and state.
4. If none of the above work, the algorithm assumes the city and state in relation to the user's location.

Finally, the address obtained is sent to an Address Validation Service (AVS).

If it is found to be valid, returns the absolute address which includes Pin Code etc. which is then plotted on the map.

If the address is found to be incorrect, the application prompts the user to provide more the missing details on the destination.

Figure 19:
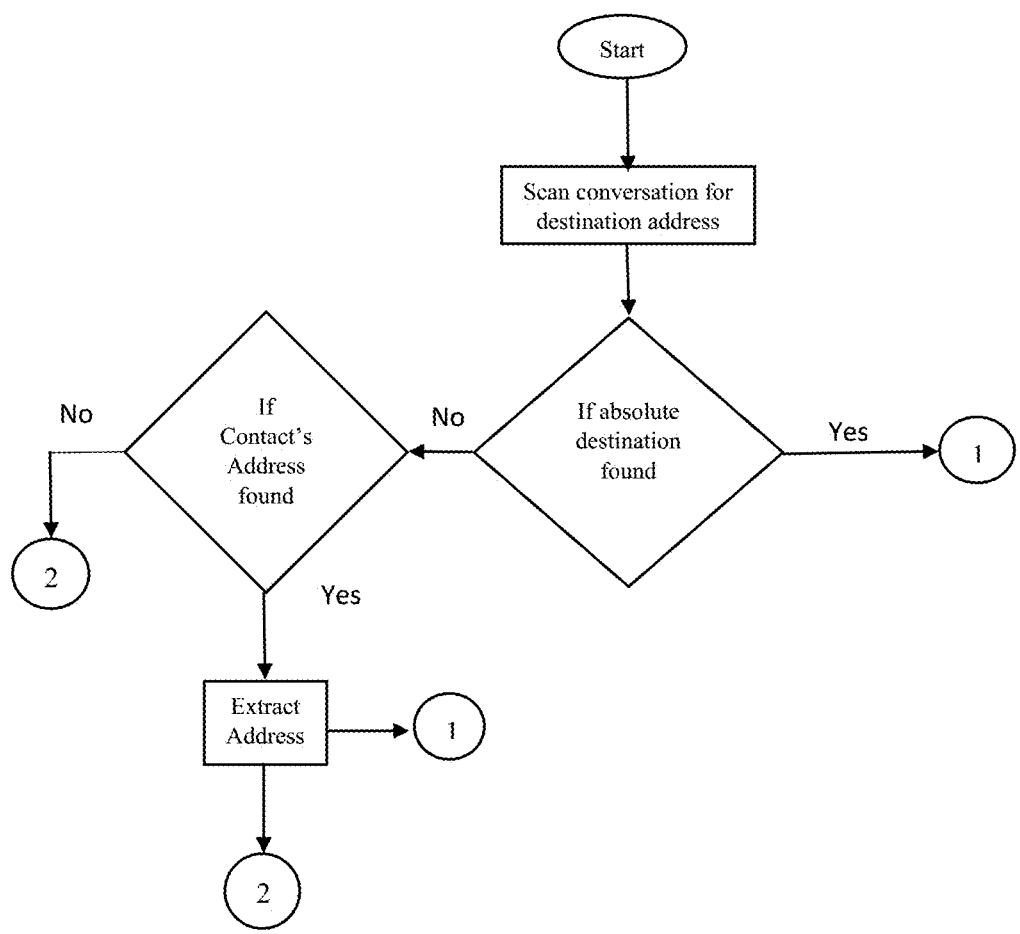
FIG. 19 is a functional block diagram flow chart of the Navigation Module showing one example of how the Destination Location Resolver operates.

Referring now to FIG. 19, FIG. 19 is a functional block diagram flow chart of the Navigation Module showing one example of how the Destination Location Resolver operates.

Figure 20:
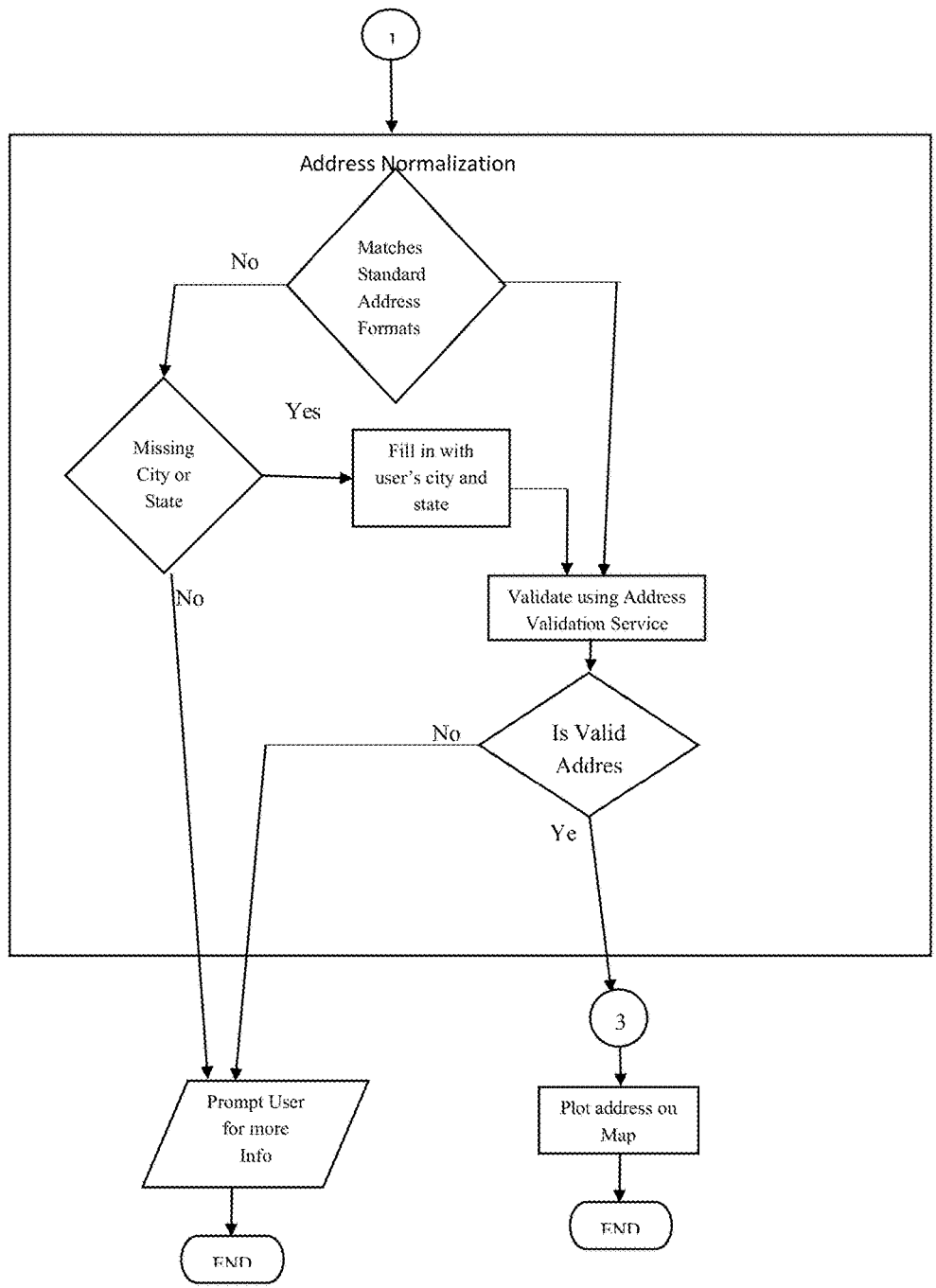
FIG. 20 is a functional block diagram flow chart of the Navigation Module showing one example of how the Source Location Resolver operates.

Referring now to FIG. 20, FIG. 20 is a functional block diagram flow chart of the Navigation Module showing one example of how the Source Location Resolver operates.

The Source Location Resolver

The Source Location Resolver works similar to the Destination Location Resolver except that it also tries to resolve the user's location at a given time based on daily location patterns.

It will first look at the input for an absolute location followed by a relative location. For example "Go to Philip's place from work", in which case it uses the work/office address of the user from the contact profile.

If this cannot be resolved it will use consult the Navigation History Module to estimate where the user will be at a given time provided the user has specified the time. If the user hasn't specified the time, the application will display a prompt asking the user "What time do you want to go there?"

For example, the user leaves his home at 8 AM to arrive at office at 9 AM and then leaves office at 6 PM to arrive home at 7 PM. Based on this simple pattern the Navigation History Module predicts that if the user needs to navigate to a place anytime between 9 AM and 6 PM, the source address will be the user's office address.

Whereas if the user needs to navigate to a place anytime between 6 PM and 9 AM the source address will be the user's home address.

Figure 21:
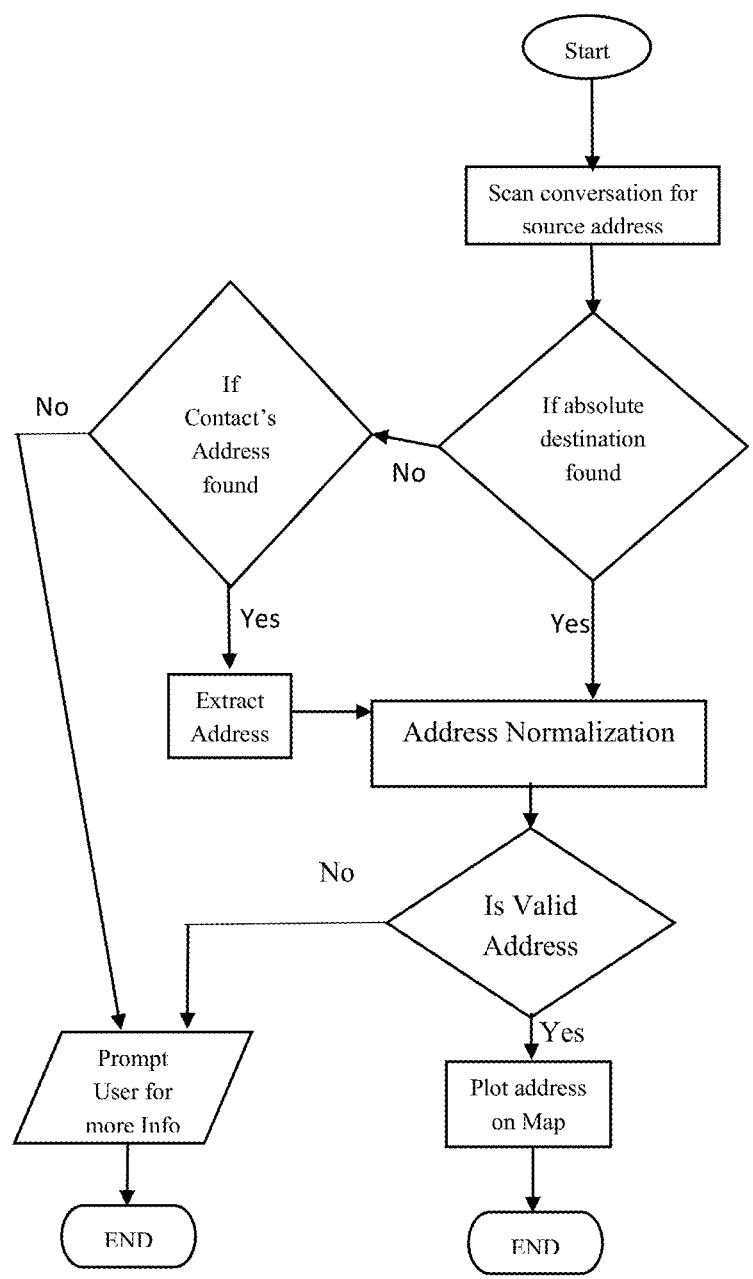
FIG. 21 is a functional block diagram flow chart of the Navigation Module showing one example of how the Mapping/Path Resolver operates

Referring now to FIG. 21, FIG. 21 is a functional block diagram flow chart of the Navigation Module showing one example of how the Mapping/Path Resolver operates.

The Path Resolver:

The Path Resolver starts off by scanning the user's conversation for any preferred routes. For example, "via the highway" or "using the fastest route" or "using the shortest route".

It finds all routes from Source to Destination and then finds the Traffic patterns, Cost and Distance across the routes.

It then consults the Navigation History Module to get the user's history of route preferences. For example, does he usually just like the fastest route or does he usually just like the shortest route.

It finally aggregates all this information and suggests the preferred route along with alternate routes based on Travel Time, Travel Distance and Travel Cost.

The Mode of Transportation Resolver

The Mode of Transportation Resolver like the Path Resolver also gets the traffic patterns from the traffic service along with getting the cost and distance.

It uses the distance and traffic patterns to calculate the approximate travel time by road.

It also obtains the travel time and cost via other routes like subway or air.

It finally aggregates all this information and suggests the preferred route along with alternate routes based on Travel Time, Travel Distance and Travel Cost.

Example 13

In the example below the application associates the sentence "Go to Philip's place at 6 PM through the highway" to a navigation action with the following attributes:

This is done as follows:
1. The keywords "Go to" triggers the Navigation Resolution flow.
2. The Destination Location Resolver finds a relative address and consults the Person Resolver to provide it the address to proceed.
3. The Person Resolver resolves "Philip" as one of the user's contact and fetches Philip's home address.
4. Since address obtained in this case is complete already contains the city and state location, it is sent to the Address Validation Service which returns that the address is valid and also returns the Zip Code and other information.
5. The Destination Location Resolver resolves Philip's Home Address to a location on the map.

Figure 22:
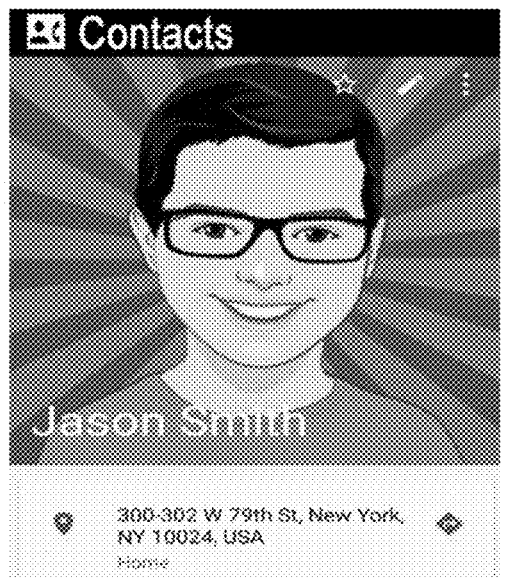
FIG. 22 is an illustrative representation of mobile device screen shot showing an example of the mapping functionality being derived from the user contacts.
Figure 22:
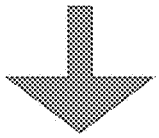
Figure 22:
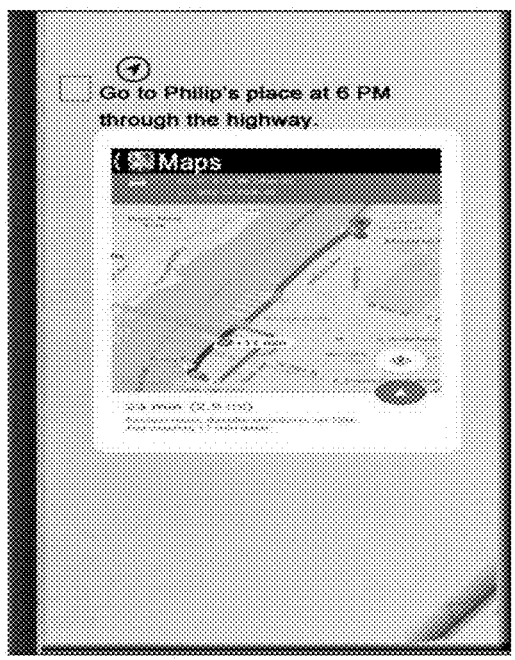

Referring now to FIG. 22, FIG. 22 is an illustrative representation of mobile device screen shot showing an example of the mapping functionality being derived from the user contacts.

6. The Source Location Resolver resolves the source location to be the location of the user at the time. In this example the user has given the time to be 6 PM and at 6 PM based on the user's daily schedule, the user is assumed to be at work so the start location is set to the user's work location.
7. The Path Resolver resolves the best way to travel at the time. It considers the user's preference, in this case the highway but also suggests preferred alternate routes/ modes of transportation based on the time of day and traffic patterns along the routes.

Figure 23:
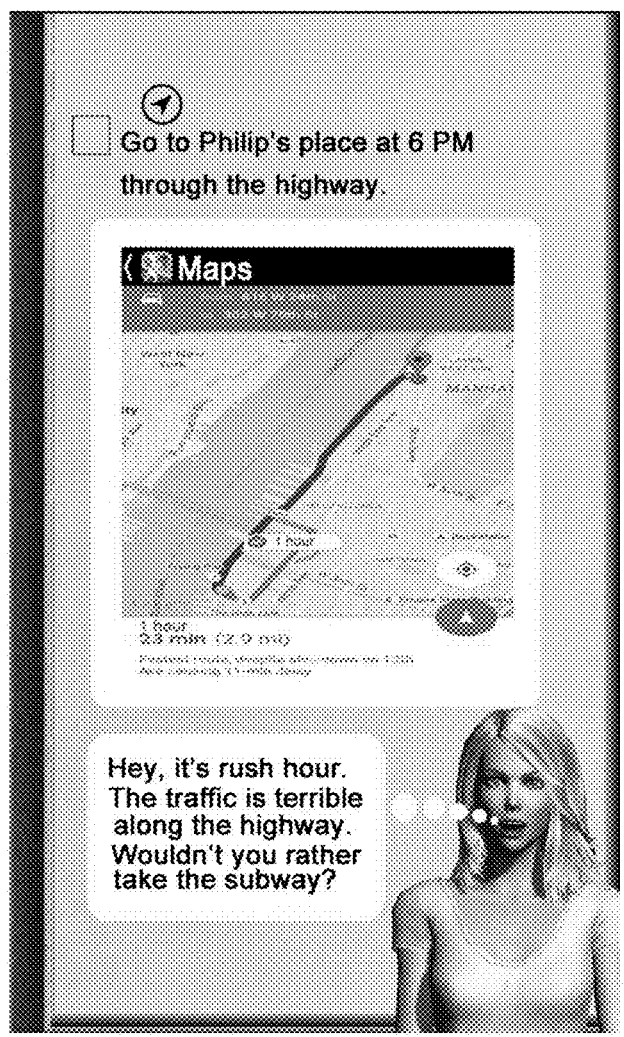
FIG. 23 is an illustrative representation of mobile device screen shot showing an example of the interaction between user input, mapping module, and virtual interactive agent providing options and recommendations.

Referring now to FIG. 23, FIG. 23 shows an illustrative representation of mobile device screen shot showing an example of the interaction between user input, mapping module, and virtual interactive agent providing options and recommendations.

Figure 24:
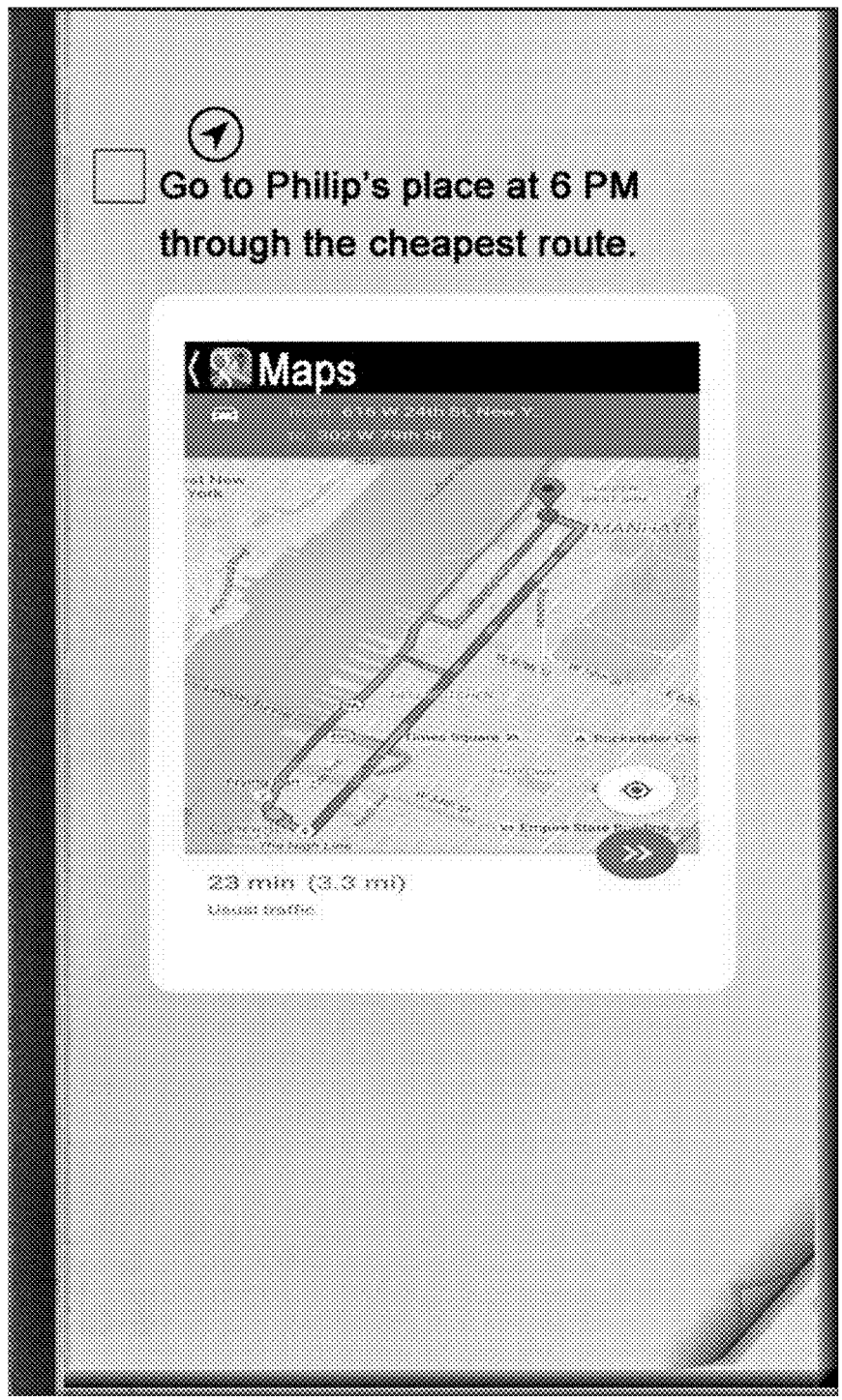
FIG. 24 is an illustrative representation of mobile device screen shot showing an example of one of the options, "cheapest", provided by the virtual interactive agent.

If the user wanted the cheapest route (avoiding highways) the Path Resolver module would choose the following route:

Referring now to FIG. 24, FIG. 24 is an illustrative representation of mobile device screen shot showing an example of one of the options, "cheapest", provided by the virtual interactive agent.

Figure 25:
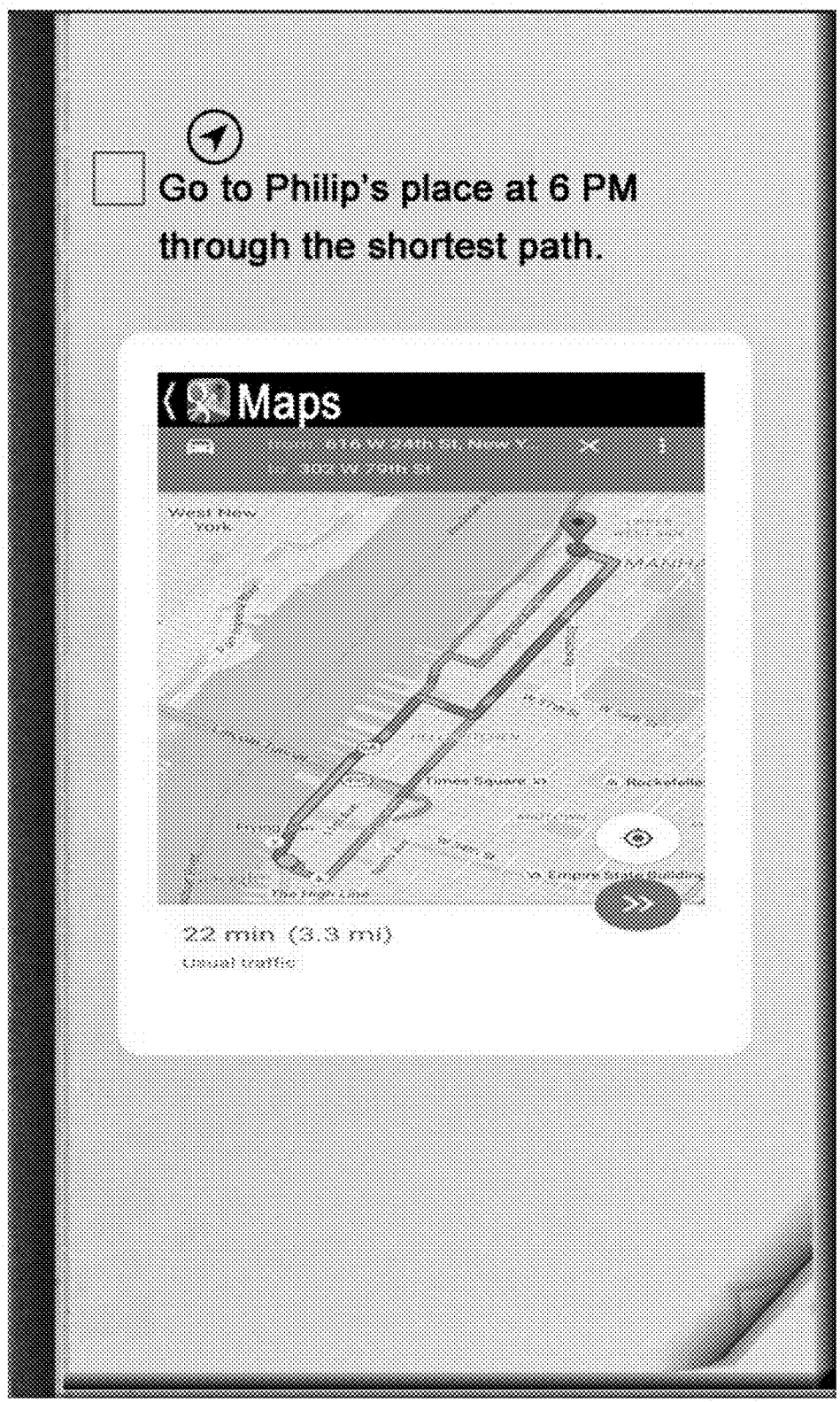
FIG. 25 is an illustrative representation of mobile device screen shot showing an example of one of the options, "shortest", provided by the virtual interactive agent.

And if the user wanted the shortest route (least distance) the Path Resolver module would choose the following route:

Referring now to FIG. 25, FIG. 25 is an illustrative representation of mobile device screen shot showing an example of one of the options, "shortest", provided by the virtual interactive agent.

And if the address was invalid or certain portions of the address were not resolved, the application would prompt the user to enter the essential address information.

Figure 26:
FIG. 26 is an illustrative representation of mobile device screen shot showing an example of the attribute clarification module requesting additional input.

Referring now to FIG. 26, FIG. 26 shows an illustrative representation of mobile device screen shot showing an example of the attribute clarification module requesting additional input.

Special Feature #8. Entity Attribute Clarification Feature

The virtual interactive assistant can prompt the user to provide certain attributes to perform an action/event. For example, if the user adds a note "Buy bananas" The animated interactive intelligent agent prompts the user to ask "How many". Or if the user adds a note "Buy Milk" the animated interactive intelligent agent prompts the user to ask "How much milk?"

Figure 27:
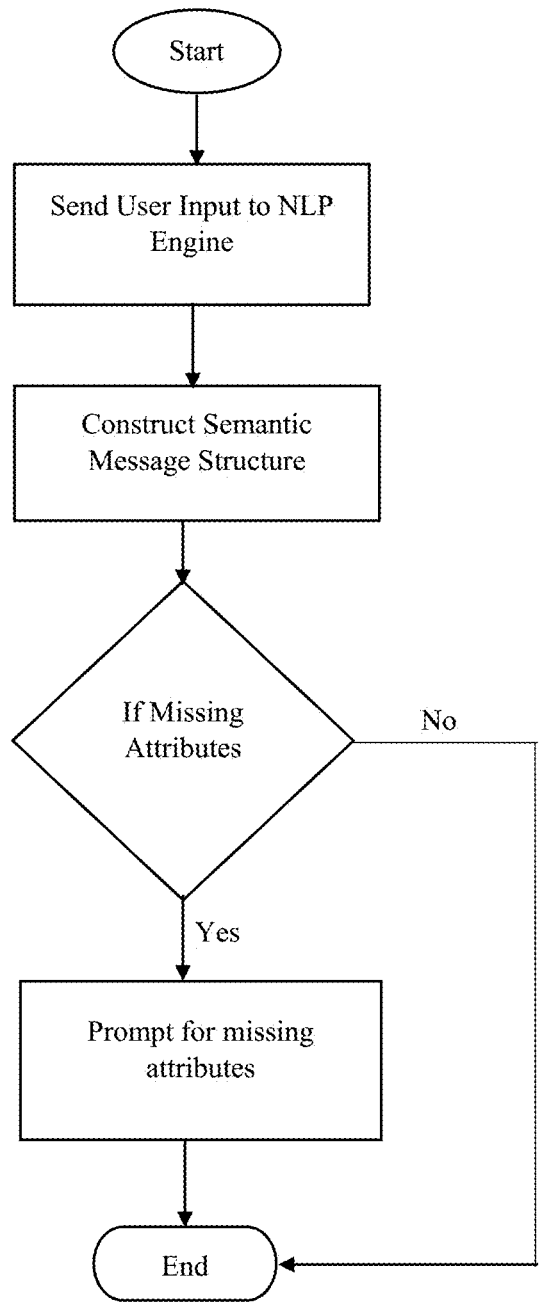
FIG. 27 is a functional block diagram showing computational flow of the Attribute Clarification module.

The process of Entity Attribute Clarification is depicted in the flowchart below and described thereafter:

Referring now to FIG. 27, FIG. 27 is a functional block diagram showing computational flow of the Attribute Clarification module.

When the user adds a new note, the text is sent to the NLP engine.

The NLP Engine converts the text to a Semantic Message Structure which can be of different types (eg: Action, Question etc.).

The virtual interactive assistant detects if there are any required attributes missing from the Semantic Message Structure and prompts the user for it.

Example 10

If the user adds "Buy bananas" the text is sent to the NLP engine which converts the text to a Semantic Message Structure of type "Action".
Buyer: <user>
Product: Bananas
Qty: <missing>
Shop: <missing>

The virtual interactive assistant, also called an animated interactive intelligent agent, detects that the structure is missing two required parameters and prompts the user to enter these.

Figure 28:
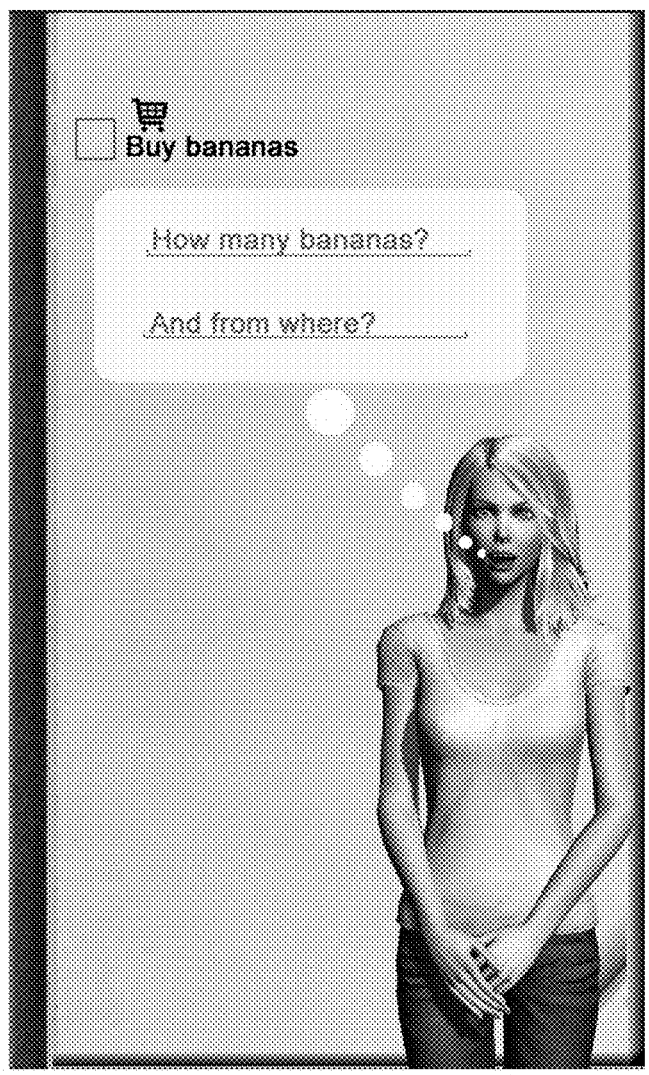
FIG. 28 is an illustrative representation of mobile device screen shot showing an example of one of the virtual interactive agent requesting additional attributes.

Referring now to FIG. 28, FIG. 28 shows an illustrative representation of mobile device screen shot showing an example of one of the virtual interactive agent requesting additional attributes.

Figure 29:
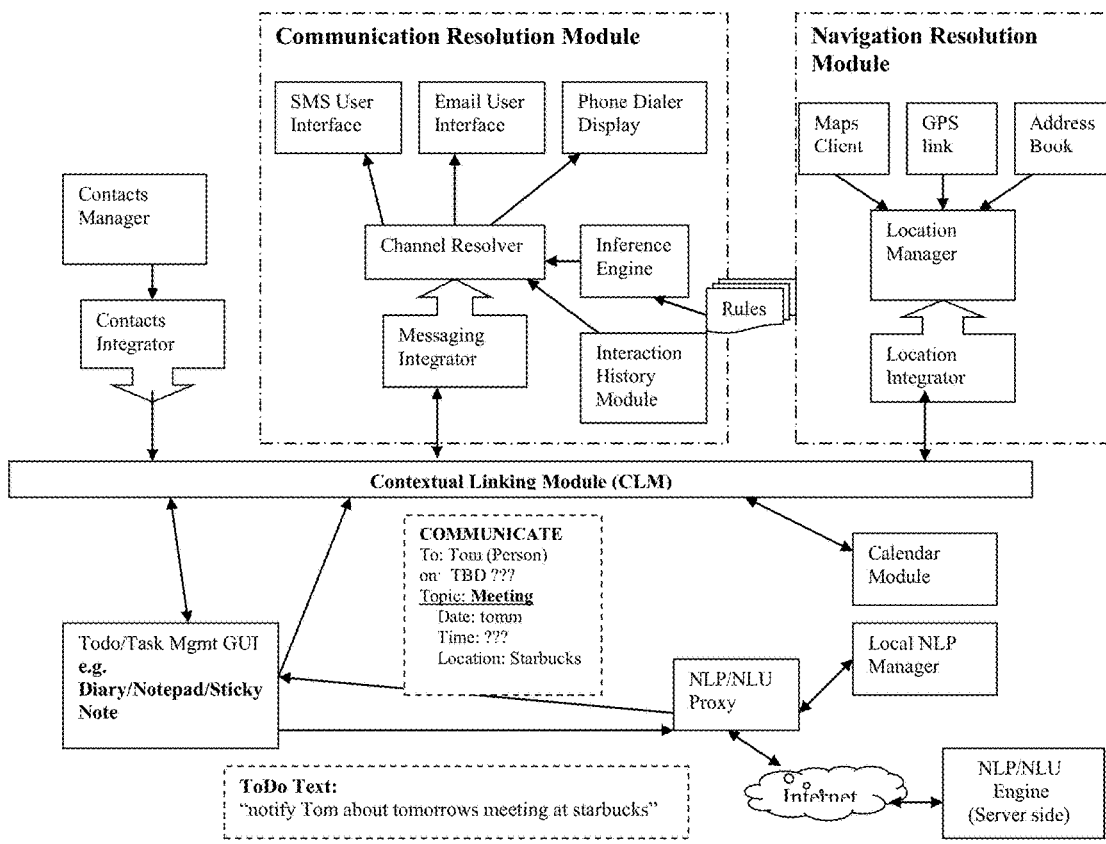
FIG. 29 is a functional block diagram of one preferred embodiment of the architecture for the contextual linking module.

Referring now to FIG. 29, The Figure above describes the Technical Architecture of the Contextual Linking Module wherein a Todo/Task Management user interface (e.g. Text Message, Messaging App, Diary, Notepad, Daily planner, Sticky Notes etc) can automatically recognize the underlying meaning of the content in the ToDo/Tasks/Notes entered by the user thereby linking the content with one of the following:

i. Communication Actions/Entities (e.g. communicating i.e. Calling, Sending SMS message to a Person on their mobile/home/work phone number or emailing them on their email id and so on at a certain date/time for a certain purpose e.g. business, work, personal), ii. Navigation Actions/Entities (e.g. going somewhere by various Means of Transportations such as car, bus, train to meet someone for accomplishing some purpose e.g. meeting, party, work etc and so on)

The automatic recognition of the Actions and Entities as described above is done using NLP (Natural Language Processing) Techniques implemented by partially by the Local NLP Manager (that partially interprets the user input content) and then transmits it to the Server Side via the NLP Proxy Module to the NLP/NLU Engine that performs the required Syntactic and Semantic analysis to derive the underlying meaning of the input content.

After detecting such Content in the Tasks/Todos and then interpreting the underlying intent of the user input using NLP Techniques (e.g. whether the user intends to make a call to someone on one of their phone numbers at a certain Date/Time for a certain purpose), the intelligent Agent then evaluates whether such Actions are appropriate (based on Socially Acceptable Behaviors and many other factors including the relationship between the parties and their Schedule and previous interaction habits).

The intelligent Agent then comes out with alternate recommendations based on common sense rules (executed by an inference engine) and previously learnt behaviors by generating a alternate proposal in plain english that recommends the user to use a. alternate communication channels (e.g. a mobile phone instead of a home phone number), b. alternate communication actions (e.g. sending a SMS message instead of Calling), c. alternate Date for communicating (e.g. calling next day or on weekend depending on priority)

d. alternate Time for communicating (e.g. calling after sometime or in the evening)

e. reduced Call Duration (e.g. keeping the call short instead of elaborating in detail)

or a combination of the above as the situation may demand.

The intelligent agent displays the above proposal/recommendation by means of an Animated 3D Personal Virtual Assistant with Facial Expressions, hand gestures and body movements in a Human like appearance.

Once the user confirms acceptance or rejection of the proposal, the intelligent Agent accordingly reacts and performs the intended communication action on the requested communication channel.

Figure 30:
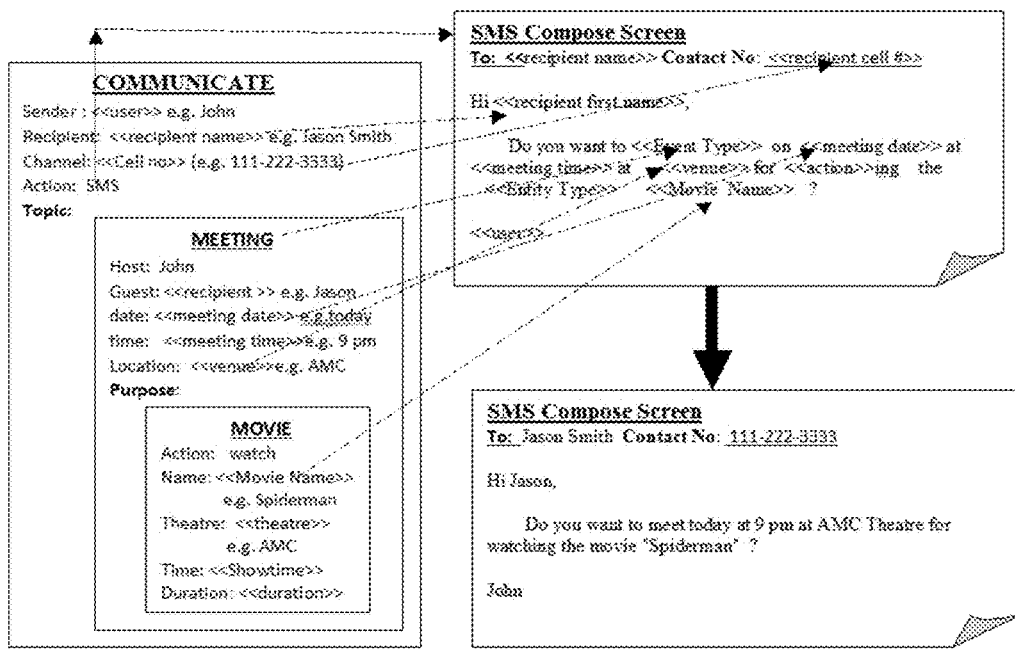
FIG. 30 is a diagram showing a semantic message structure mapped to response templates.

Referring now to FIG. 30 is a diagram showing a semantic message structure mapped to response templates. FIG. 30 illustrates how Semantic Message Structure). Please note that such Semantic Message Structures (nested or otherwise) are created by passing the user input sentence e.g. "text Jason about meeting at AMC today at 9 pm to watch Spiderman" to the NLP/NLU Engine.

The Next Step includes converting Semantic Message Structure (nested or otherwise) into Response Templates by the Semantic Message Converter.

The Response Template has place holders for every variable field e.g. <<recipient name>>, <<movie name>>, <<date>> etc. (all the variables are represented by double left and right arrows i.e. <<, >>)

These place holders are mapped to the field names in the Semantic Message Structure (the mappings are shown in the figure).

Some mappings also include a procedure e.g. to convert the name to only the first name, convert the person name to a pronoun.

Such transformations make it possible to convert the Semantic Message Structure to a 2nd person sentence.

INCORPORATION AND STATEMENT OF EQUIVALENTS

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A portable electronic device in communication with remote computing equipment over a communications path, comprising:
   one or more input devices;
   one or more output devices;
   one or more processors; and
   memory storing one or more programs configured to be executed by the one or more processors, the one or more programs including instructions for:
   providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in one or more mobile electronic display notes displayed in a container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user-said human-like animation comprises matched human-like characteristics, said characteristics comprising a human-like facial proportions, a human-like appearance, a human-like voice, and human-like gestures; and
   in response to user input in a messaging application, processing content of the user input, said processing content comprising at least in part Natural Language Processing, and providing feedback to the user:
   wherein the feedback comprises a graphical or spoken output from the portable electronic device, said output programmed to represent knowledge in a Cognitive Model using Semantic Actions and Entities/Concepts and their inter-relationships, said output programmed to express knowledge by generating English responses using Natural Language Generation (NLG), aid output programmed to maintain behavioral states and feelings in a computational manner as a result of circumstantial triggers, user behavior and productivity of Interactive Intelligent Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory;
   said output comprising an offer of an alternative communication mode,
   wherein processing content of the user input comprises analyzing message content to collect parameters relating to message priority, channel type, channel availability, user schedule, user time zone, relationship of user to recipient, type of content, and number of recipients, and saving said collected parameters to memory;
   wherein the relationship parameter is calculated using a familiarity index, the familiarity index comprising a numerical value based on relationship hierarchy;
   wherein the one or more program include instructions for providing feedback to the user wherein the feedback comprises a graphical or spoken output from the portable electronic device, said output comprising wherein a recipient schedule is retrieved as a parameter, wherein the recipient schedule parameter is compared to a user schedule parameter and a scheduling database is populated with an entry that uses the comparison data; and
   wherein specific customized personality profile parameters are set to establish priority overrides where a user schedule has a different priority than a recipient schedule.

2. The portable electronic device of claim 1, further comprising wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

3. The portable electronic device of claim 1, further comprising wherein the one or more programs include instructions for providing feedback to the user wherein the feedback comprises a graphical or spoken output from the portable electronic device, said output comprising a series of selectable options for modifying the initial user input.

4. The portable electronic device of claim 1, further comprising wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service.

5. The portable electronic device of claim 1, further comprising wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

6. The portable electronic device of claim 1, further comprising wherein the one or more programs include instructions for providing feedback to the user wherein the feedback comprises a graphical or spoken output from the portable electronic device, said output comprising an automated re-transcription of content with said user input based on said relationship hierarchy.

7. A method of providing a contextual linking application having an animated interactive intelligent agent for managing communications with contacts in a portable mobile electronic device, comprising the steps:

in a mobile electronic device having one or more processors, and memory storing one or more programs configured to be executed by the one or more processors, executing one or more programs including instructions for providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and in response to user input in a messaging application, processing content of the user input, said processing content comprising at least in part Natural Language Processing, and providing feedback to the user;

wherein the feedback comprises a graphical or spoken output from the portable electronic device, said output programmed to represent knowledge in a Cognitive Model using Semantic Actions and Entities/Concepts and their inter-relationships, said output programmed to express knowledge by generating English responses using Natural Language Generation (NLG), aid output programmed to maintain behavioral states and feelings in a computational manner as a result of circumstantial triggers, user behavior and productivity of Interactive Intelligent Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory; said output comprising an offer of an alternative communication mode;

wherein processing content of the user input comprises analyzing message content to collect parameters relating to message priority, channel type, channel availability, user schedule, user time zone, relationship of user to recipient, type of content, and number of recipients, and saving said collected parameters to memory;

wherein the relationship parameter is calculated using a familiarity index, the familiarity index comprising a numerical value based on relationship hierarchy;

wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory;

wherein the one or more program include instructions for providing feedback to the user wherein the feedback comprises a graphical or spoken output from the portable electronic device, said output comprising wherein a recipient schedule is retrieved as a parameter, wherein the recipient schedule parameter is compared to a user schedule parameter and a scheduling database is populated with an entry that uses the comparison data; and wherein specific customized personality profile parameters are set to establish priority overrides where a user schedule has a different priority than a recipient schedule.

8. The method of claim 7, further comprising the step wherein the one or more programs include instructions for providing feedback to the user wherein the feedback comprises a graphical or spoken output from the portable electronic device, said output comprising a series of selectable options for modifying the initial user input.

9. The method of claim 7, further comprising the step wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service.

10. The method of claim 7, further comprising the step wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

11. The method of claim 7, further comprising the step wherein the one or more programs include instructions for providing feedback to the user wherein the feedback comprises a graphical or spoken output from the portable electronic device, said output comprising an automated re-transcription of content with said user input based on said relationship hierarchy.

12. A non-transitory computer-readable storage medium comprising instructions that, when executed by a processor, cause the processor to:
provide a contextual linking application having an animated interactive intelligent agent for managing communications with contacts in a portable mobile electronic device,
said application including instructions for providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and
in response to user input in a messaging application, processing content of the user input, said processing content comprising at least in part Natural Language Processing, and providing feedback to the use;
wherein the feedback comprises a graphical or spoken output from the portable electronic device, said output programmed to represent knowledge in a Cognitive Model using Semantic Actions and Entities/Concepts and their inter-relationships, said output programmed to express knowledge by generating English responses using Natural Language Generation (NLG), aid output programmed to maintain behavioral states and feelings in a computational manner as a result of circumstantial triggers, user behavior and productivity of Interactive Intelligent Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory: said output comprising an offer of an alternative communication mode,
wherein processing content of the user input comprises analyzing message content to collect parameters relating to message priority, channel type, channel availability, user schedule, user time zone, relationship of user to recipient, type of content, and number of recipients, and saving said collected parameters to memory;
wherein the relationship parameter is calculated using a familiarity index, the familiarity index comprising a numerical value based on relationship hierarch;
wherein the application includes instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory;
wherein the one or more program include instructions for providing feedback to the user wherein the feedback comprises a graphical or spoken output from the portable electronic device, said output comprising wherein a recipient schedule is retrieved as a parameter, wherein the recipient schedule parameter is compared to a user schedule parameter and a scheduling database is populated with an entry that uses the comparison data; and
wherein specific customized personality profile parameters are set to establish priority overrides where a user schedule has a different priority than a recipient schedule.

* * * * *